United States Patent
Chen et al.

(10) Patent No.: US 9,451,630 B2
(45) Date of Patent: Sep. 20, 2016

(54) DYNAMIC CONFIGURATION OF WIRELESS CIRCUITRY TO MITIGATE INTERFERENCE AMONG COMPONENTS IN A COMPUTING DEVICE

(71) Applicant: Apple Inc., Cupertino, CA (US)

(72) Inventors: Camille Chen, Cupertino, CA (US); Derek K. Ng, San Francisco, CA (US); Benjamin P. Walter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 14/088,299

(22) Filed: Nov. 22, 2013

(65) Prior Publication Data

US 2015/0133185 A1    May 14, 2015

Related U.S. Application Data

(60) Provisional application No. 61/904,426, filed on Nov. 14, 2013.

(51) Int. Cl.
*H04W 72/12* (2009.01)
*H04W 88/06* (2009.01)
*H04W 84/12* (2009.01)
*H04W 4/00* (2009.01)

(52) U.S. Cl.
CPC ......... *H04W 72/1215* (2013.01); *H04W 4/008* (2013.01); *H04W 84/12* (2013.01); *H04W 88/06* (2013.01)

(58) Field of Classification Search
CPC .... H04B 1/006; H04B 1/0096; H04B 15/00; H04B 15/02; H04W 16/14; H04W 72/1215; H04W 4/008; H04W 84/12; H04W 88/06
USPC ............... 455/63.1, 63.2, 63.3, 63.4, 114.2, 455/278.1, 296; 375/144, 148, 346, 347, 375/348, 349
See application file for complete search history.

(56) References Cited

U.S. PATENT DOCUMENTS

2007/0093270 A1 *  4/2007  Lagnado ............. H04B 7/0689
                                                     455/562.1

(Continued)

FOREIGN PATENT DOCUMENTS

WO     WO 2013159312 A1 * 10/2013 ............. H04B 15/04

*Primary Examiner* — Thai Vu
(74) *Attorney, Agent, or Firm* — Downey Brand LLP

(57) ABSTRACT

Methods and apparatus to mitigate coexistence interference among multiple wireless subsystems and wired connection ports of a computing device are described. A processor obtains configurations for at least two wireless subsystems and for a connection state of at least one wired connection port. When the first and second wireless subsystem configurations or the connection state of the at least one wired connection port indicate potential or actual coexistence interference, the processor is configured to adjust wireless circuitry of the first and second wireless subsystems. The first wireless subsystem is configured based on frequency bands used by the first and second wireless subsystems, while the second wireless subsystem is configured based on the connection state. In an embodiment, the first wireless subsystem operates in accordance with a wireless personal area network protocol, and the second wireless subsystem operates in accordance with a wireless local area network protocol.

19 Claims, 14 Drawing Sheets

(56) References Cited

U.S. PATENT DOCUMENTS

| | | | |
|---|---|---|---|
| 2009/0285167 A1* | 11/2009 | Hirsch | H04W 72/1215 370/329 |
| 2012/0142296 A1* | 6/2012 | Cotterill | H04B 7/0877 455/230 |
| 2013/0336140 A1* | 12/2013 | Ma | H04W 76/04 370/252 |
| 2014/0241406 A1* | 8/2014 | Yu | H04B 15/02 375/219 |
| 2015/0134863 A1* | 5/2015 | Hsieh | H04L 43/0894 710/106 |

* cited by examiner

1000 ⟶

| State Number | State Environment | Wi-Fi Configuration |
|---|---|---|
| 1 | Powered, Not Associated, Not Operating As A Shared Wireless Access Point (SWAP) | If USB 3.0 Device Connected, Configure Antennas For 3x2 Spatial Streams; Otherwise, Configure Antennas For 3x3 Spatial Streams. |
| 2 | Operating In 5.0 GHz Band | Configure Antennas For 3x3 Spatial Streams |
| 3 | Operating In 2.4 GHz Band And BT Utilization < 5% | If USB 3.0 Device Connected, Configure Antennas For 3x2 Spatial Streams; Otherwise, Configure Antennas For 3x3 Spatial Streams. |
| 4 | Operating In 2.4 GHz Band And 5% ≤ BT Utilization ≤ 40% | If USB 3.0 Device Connected, Configure Antennas For 3x2 Spatial Streams; Otherwise, Configure Antennas For 3x3 Spatial Streams. |
| 5 | Operating In 2.4 GHz Band And BT Utilization > 40% | If USB 3.0 Device Connected, Configure Antennas For 3x2 Spatial Streams; Otherwise, Configure Antennas For 3x3 Spatial Streams. |

| State Number | State Environment | Wireless Circuitry Configuration |
|---|---|---|
| 1 | Powered, Not Associated, Not Operating As A Shared Wireless Access Point (SWAP) | • BT Coex = OFF<br>• Wi-Fi ACK = (ON,ON,ON)<br>• Wi-Fi Tx Pwr Offsets = (0,0,0)<br>• Wi-Fi Pwr = (ON,Tx,ON) if USB 3.0 Active, else (ON,ON,ON)<br>• Wi-Fi Tx = 2 streams if USB 3.0 Active, else Default<br>• Wi-Fi Desense = OFF |
| 2 | Operating In 5.0 GHz Band | • BT Coex = OFF<br>• Wi-Fi ACK = (ON,ON,ON)<br>• Wi-Fi Tx Pwr Offsets = (0,0,0)<br>• Wi-Fi Pwr = (ON,ON,ON)<br>• Wi-Fi Tx = Default<br>• Wi-Fi Desense = OFF |
| 3 | Operating In 2.4 GHz Band And BT Utilization < Low % Threshold | • BT Coex = Hybrid<br>• Wi-Fi ACK = (ON,ON,ON)<br>• Wi-Fi Tx Pwr Offsets = (0,0,0)<br>• Wi-Fi Pwr = (ON,Tx,ON) if USB 3.0 Active else (ON,ON,ON)<br>• Wi-Fi Tx = 2 streams if USB 3.0 Active, else Default<br>• Wi-Fi Desense = OFF |
| 4 | Operating In 2.4 GHz Band And Low % Threshold ≤ BT Utilization ≤ High % Threshold | • BT Coex = Hybrid<br>• Wi-Fi ACK = (OFF,ON,OFF)<br>• Wi-Fi Tx Pwr Offsets = (0,0,0)<br>• Wi-Fi Pwr = (ON,Tx,ON) if USB 3.0 Active else (ON,ON,ON)<br>• Wi-Fi Tx = 2 streams if USB 3.0 Active, else Default<br>• Wi-Fi Desense = ON if A2DP or SCO Devices On BT else Wi-Fi Desense = OFF |
| 5 | Operating In 2.4 GHz Band And BT Utilization > High % Threshold | • BT Coex = Hybrid<br>• Wi-Fi ACK = (OFF,ON,OFF)<br>• Wi-Fi Tx Pwr Offsets = (0,0,0)<br>• Wi-Fi Pwr = (ON,Tx,ON) if USB 3.0 Active else (ON,ON,ON)<br>• Wi-Fi Tx = 2 streams if USB 3.0 Active, else Default<br>• Wi-Fi Desense = ON |

| State Number | State Environment | Wireless Circuitry Configuration |
|---|---|---|
| 3,4,5 | Operating in 2.4 GHz Band And BT Peripheral Device Connected | • BT Desense = ON<br>• BT Set Fixed AFH Map<br>• BT Reduce Tx Pwr |
| 1,2,3,4,5 | Any | • Set BT Coex Mode<br>• Set Wi-Fi Desense Mode<br>• Set Wi-Fi Desense Level<br>• Set Wi-Fi Tx Pwr Offsets<br>• Apply Wi-Fi Tx Pwr Settings<br>• Apply Wi-Fi ACK Settings<br>• When Wi-Fi not on 802.11b/g Network and Wi-Fi Changes Between Tx = 2 Streams and Tx = 3 Streams:<br>    Issue Wi-Fi 802.11 Reassociation and Set Wi-Fi Tx Stream Override |

FIG. 11B

DYNAMIC CONFIGURATION OF WIRELESS CIRCUITRY TO MITIGATE INTERFERENCE AMONG COMPONENTS IN A COMPUTING DEVICE

CROSS-REFERENCE TO RELATED APPLICATIONS

This application claims the benefit of U.S. Provisional Application No. 61/904,426, filed Nov. 14, 2013 and entitled "DYNAMIC CONFIGURATION OF WIRELESS CIRCUITRY TO MITIGATE INTERFERENCE AMONG COMPONENTS IN A COMPUTING DEVICE", which is incorporated by reference herein in its entirety for all purposes.

TECHNICAL FIELD

The described embodiments relate generally to wireless communications and more particularly to facilitating in-device coexistence between multiple wireless subsystems and wired connection ports in a computing device to mitigate radio frequency interference among components and to optimize performance of the multiple wireless subsystems.

BACKGROUND

Many modern computing devices include multiple wireless subsystems, which may also be referred to as radios or collectively as wireless circuitry herein. A computing device can use the wireless circuitry to communicate concurrently via multiple wireless communication technologies. In many instances, wireless communication technologies used by the computing device use frequency channel bands (sets of radio frequencies) that may interfere with each other. In such instances, energy used by one wireless subsystem in a particular frequency channel band can leak into an overlapping, adjacent, or non-overlapping distant frequency channel band used by another wireless subsystem in the same computing device. This energy leakage can raise the noise floor for receive signal chains of the wireless circuitry, can cause a problem known as "desense," and can affect the performance of wireless communication through the wireless circuitry. In many instances, radio frequency interference from co-located wireless subsystems or from wired connection ports can negatively impact the use of certain radio frequency channel bands and, in severe cases, can render certain radio frequency channel bands unusable. Accordingly, wireless radio frequency interference that can result in desense poses a problem for in-device coexistence of multiple wireless subsystems that use different wireless communication technologies.

In a representative scenario, one wireless subsystem can emit a transmission via a first wireless communication technology, which can be referred to as an aggressor wireless communication technology, or aggressor technology, while another wireless subsystem can receive data via a second wireless communication technology, which can be referred to as a victim wireless communication technology, or victim technology. Data reception via the victim technology can be impacted by the aggressor transmission, particularly in instances in which the wireless subsystem using the aggressor technology uses a relatively high transmission power. In this regard, received packet errors in received signals, or even complete deafening of a receiver that uses the victim wireless subsystem access technology can result from radio frequency interference that can be caused by the co-located aggressor technology transmission. For example, simultaneous radio frequency transmissions by a wireless personal area network (WPAN) signal from a first wireless subsystem operating in a computing device while also receiving radio frequency signals of a wireless local area network (WLAN) signal via a second wireless subsystem on the computing device can impact the performance of the second wireless subsystem, e.g., causing errors or unstable connections. Additionally, computing devices can include high-speed wired connection points, and in some instances, interfering radio frequency energy can be emitted by an active high-speed wired connection port that can result in errors in the transmission and/or reception of wireless signals, e.g., via a WLAN or WPAN connection. Representative wireless connections can include those that operate in accordance with an IEEE 802.11 Wi-Fi communication protocol or a Bluetooth communication protocol. Representative wired connection ports (and associated connected devices) can include those that operate in accordance with a universal serial bus (USB) communication protocol. Radio frequency interference received by a wireless subsystem from a co-located wireless subsystem or received from radio frequency energy radiated by a wired connection port in the same computing device shall be referred to herein as coexistence radio frequency interference, or coexistence interference for short. Methods and apparatus to mitigate coexistence interference and improve performance of wireless subsystems in a computing device are further described in detail herein.

SUMMARY OF THE DESCRIBED EMBODIMENTS

Methods and apparatus to mitigate coexistence interference among multiple wireless subsystems and wired connection ports of a computing device to optimize performance of the multiple wireless subsystems are described. A processor obtains configurations for at least two wireless subsystems and a connection state of at least one wired connection port. When the first and second wireless subsystem configurations or the connection state of the wired connection port indicate potential or actual coexistence interference at the computing device, the processor is configured to adjust wireless circuitry of the first and second wireless subsystems. The first wireless subsystem is configured based at least in part on frequency bands used by the first and second wireless subsystems, while the second wireless subsystem is configured at least in part based on the connection state of the at least one wired connection port. In an embodiment, the first wireless subsystem operates in accordance with a wireless personal area network protocol, and the second wireless subsystem operates in accordance with a wireless local area network protocol. In an embodiment, the wired connection port is a high-speed wired connection port operating in accordance with a universal serial bus protocol. In an embodiment, the processor adjusts wireless circuitry of the first and second wireless subsystems based on utilization levels, e.g., of one or more of the wireless subsystems. In some embodiments, the processor adjusts wireless circuitry to mitigate coexistence interference by adjusting one or more of: transmit power levels, transmit timing, transmit and/or receive signal chain configurations, use of particular antennas, transmit formats (e.g., restrictions to specific types of messages), multiple-input multiple-output (MIMO) transmission and reception configurations, receive gain control, and receive signal path selection. In an embodiment, the processor configures wireless circuitry of the multiple wireless subsystems in a computing device to use a transmit mode, a receive mode, or a control mode of operation to mitigate coexistence interference.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 10 illustrates a table of configurations of a wireless subsystem based on different operating states of a set of wireless subsystems in a computing device in accordance with some embodiments.

FIGS. 11A and 11B illustrate additional tables of configurations for a set of wireless subsystems based on different operates states of the set of wireless subsystems in a computing device in accordance with some embodiments.

DETAILED DESCRIPTION OF SELECTED EMBODIMENTS

Figure 1:
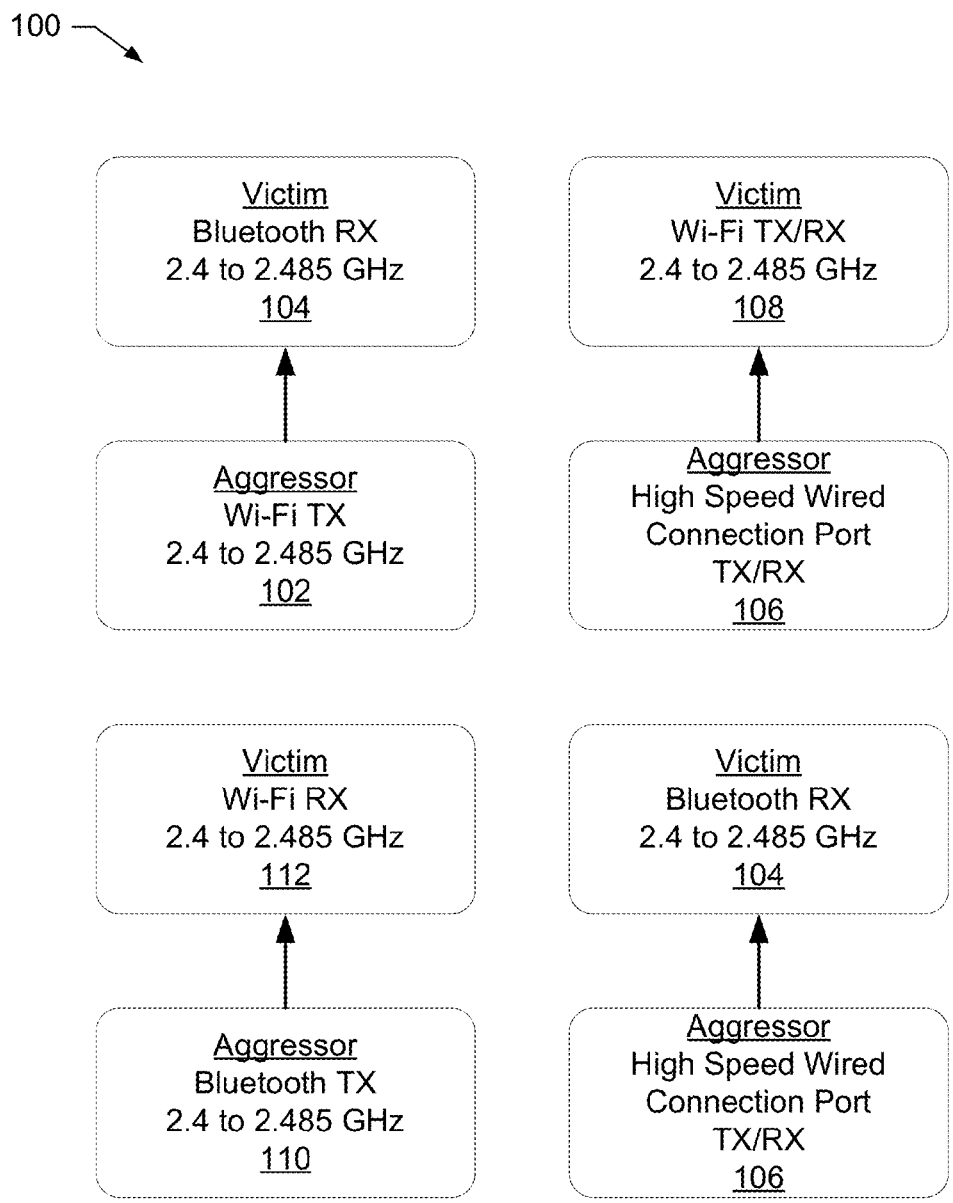
FIG. 1 illustrates an example of radio frequency interference between an aggressor technology and a victim technology in accordance with some embodiments.

Methods and apparatus to mitigate radio frequency interference among multiple wireless and wired subsystems co-located in a computing device to optimize performance of the multiple wireless subsystems are disclosed. Coexistence interference between different wireless subsystems and/or between a wired subsystem and a wireless subsystem in a computing device can result from radio frequency energy emitted by a first wireless subsystem or by a wired subsystem being received by a second wireless subsystem, e.g., due to operating in the same frequency band, because of spillover when operating in adjacent or nearby frequency bands, from higher order harmonics and intermodulation distortion that can occur between non-overlapping frequency bands, or based on other factors. A host processor in the computing device in conjunction with control circuitry for the multiple wireless subsystems can monitor operating conditions to detect configurations of the wireless subsystems that can result in potential or actual coexistence interference between two or more of the multiple wireless subsystems. The host processor, alone or in combination with additional control circuitry, can also monitor configurations of one or more wired connection ports of one or more wired subsystems to determine potential or actual coexistence interference between a wired subsystem and a wireless subsystem in the computing device. In some embodiments, the control circuitry can include its own processor(s), which can perform aspects of the coexistence interference mitigation methods described herein, e.g., alone or in combination with the host processor. The host processor in conjunction with control circuitry can configure operating parameters for at least one of the wireless subsystems to mitigate potential or actual coexistence interference based on the detection of one or more operating states of the wired and/or wireless subsystems of the computing device. In some embodiments, the host processor can provide information about the configuration of one or more wired subsystems and/or of one or more wireless subsystems to control circuitry associated with one or more of the wireless subsystems. In some embodiments, the host processor can configure particular settings for a wired subsystem and/or for one or more wireless subsystems in the computing device. Representative settings to adjust can include transmit power levels, transmit data rates, time periods for transmission, transmit frequencies, transmit and/or receive frequency bands, frequency hopping masks, operating modes, transmission timing, antenna configurations, single/multiple-input/output modes, power on/off modes, receive gain control, receive signal chain configurations, and receive signal path selection. Representative settings can include adjusting operation of one or more antennas used by a first wireless subsystem in order to mitigate interference with the transmission and/or reception of signals by other antennas of a second wireless subsystem. In some embodiments, the first and second wireless subsystems can be interconnected by a real time communication interface, and each of the wireless subsystems can provide information and/or requests to each other in order to facilitate coexistence interference mitigation. A wireless subsystem can adjust its own operation in response to messages received from the host processor and/or from another wireless subsystem in the computing device. Modification of operation by a wireless subsystem can be conditioned on operating states and/or link quality conditions for the wireless subsystem. In some embodiments, one wireless subsystem can have priority for data transmission and/or data reception over another wireless subsystem. In some embodiments, a wireless subsystem can prioritize its own transmission or reception to ensure stability during critical operations and/or to ensure transmission or reception of data or signaling messages during particular procedures.

A wireless subsystem of the computing device can include transmitters and receivers to provide signal processing of radio frequency wireless signals formatted according to wireless communication protocols, e.g., according to an 802.11 Wi-Fi wireless communication protocol or a Bluetooth wireless communication protocol. In some embodiments, the wireless subsystem can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless subsystem can be referred to herein as a radio and can include one or more components as described hereinabove.

Some example embodiments address in-device coexistence and interference mitigation for multiple wireless subsystems using disparate wireless communication technologies in the same computing device. In this regard, computing devices often include multiple wireless subsystems, each of which can implement one or more disparate wireless communication technologies, which coexist on the computing device. For example multiple local/personal area network wireless subsystems, such as a Bluetooth wireless subsystem and WLAN (e.g., Wi-Fi) wireless subsystem can coexist in the computing device. In embodiments including a Wi-Fi Radio, the Wi-Fi wireless subsystem can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The wireless subsystems can use an industrial, scientific and medical (ISM) frequency band. For example, Bluetooth can operate in the 2.4 GHz ISM frequency band, while a WLAN wireless subsystem can operate in the 2.4 GHz and/or 5 GHz ISM frequency bands.

Concurrent operation of multiple wireless subsystems on a computing device can result in coexistence interference between wireless subsystems. In addition, concurrent operation of one or more high speed wired interfaces and one or more wireless subsystems can also result in coexistence interference into one or more of the wireless subsystems in the computing device. In this regard, coexistence interference can result from a transmissions emitted by a wireless subsystem using an aggressor technology (or by radio frequency interference radiated by a high-speed wired interface connected to an active external device) while a wireless subsystem is receiving data via a victim technology. In such situations, the aggressor technology transmissions can inhibit data reception via the victim technology, potentially resulting in received data errors, or in extreme cases, completely deafening the victim technology receiver. This radio frequency (RF) interference can be caused by a number of side effects that can result from concurrent operation of multiple wireless subsystems and/or by concurrent operation of one or more high-speed wired interfaces and one or more wireless subsystems in the same computing device.

FIG. 1 illustrates a diagram 100 of several representative coexistence interference scenarios that can arise with co-located wireless subsystems and wired subsystems in a computing device. In an embodiment, a first wireless subsystem 102 operates in accordance with one or more 802.11 Wi-Fi communication protocols, some of which can operate in a 2.4 GHz frequency band and some of which can operate in a 5.0 GHz frequency band. In the embodiment, a second wireless subsystem 104 operates in accordance with a Bluetooth wireless communication protocol that operates in a 2.4 GHz frequency band. Depending on an amount of radio frequency isolation between one or more transmit antennas of the first wireless subsystem 102 and an antenna of the second wireless subsystem 104, transmissions by the first (Wi-Fi) wireless subsystem 102 can interfere with the reception of signals by the second (Bluetooth) wireless subsystem 104. The Wi-Fi transmitter (TX) operating in the 2.4 GHz frequency band can be considered an "aggressor" that interferes with the Bluetooth receiver (RX), which can be considered a "victim," when operating in the same 2.4 GHz frequency band. In some embodiments, the Wi-Fi wireless subsystem 102, which can operate using one or more antennas from a set of multiple antennas, can select among which antennas to use to reduce interference with the co-located Bluetooth wireless subsystem 104. In another scenario illustrated in FIG. 1, a high-speed wired connection port 106, which can transmit and receive (TX/RX) high-speed wired signals to one or more connected external devices, can radiate radio frequency energy that can interfere with the transmission and/or the reception of wireless radio frequency signals of a co-located Wi-Fi wireless subsystem 108. In this scenario, the wired subsystem 106 is the "aggressor", while the wireless Wi-Fi subsystem 108 is the "victim." In a similar scenario, radio frequency interference emitted by the high-speed wired connection port 106, which can be the "aggressor," can interfere with reception of signals by the Bluetooth receiver 104, which can be the "victim," co-located in the computing device. In a further scenario, a Bluetooth transmitter 110 can interfere with reception of Wi-Fi signals by a Wi-Fi receiver 112 operating in the 2.4 GHz band via one or more co-located antennas (and via associated receive signal chains) when the Bluetooth transmitter 110 and the Wi-Fi receiver 112 are both configured to share or use an overlapping frequency band, such as the illustrated 2.4 to 2.485 GHz frequency band. A transmit antenna used by the Bluetooth transmitter 110 can, under some operating settings, transmit radio frequency energy at a level that can cause radio frequency interference with the reception of Wi-Fi signals by the Wi-Fi receiver 112, e.g., via an antenna used by the Wi-Fi receiver 112 having insufficient radio frequency isolation from the antenna used by the BT transmitter 110. The design of the computing device can limit the physical placement of antennas for the various wireless subsystems such that under certain operating conditions one or more co-located wireless subsystem can interfere with each other. Similarly, radio frequency energy radiated by a high-speed connection port (e.g., when an external device is connected and active) can interfere with the transmission or reception of radio frequency signals via antennas located near the high-speed connection port. For example, a transmitting antenna for a first wireless subsystem can be located near to a receiving antenna for a second wireless subsystem such that the isolation between them in a shared or overlapping frequency band is insufficient. To mitigate coexistence interference among the wired and wireless subsystems, configurations and operating conditions of co-located wired and/or wireless subsystems can be taken into account when configuring or operating a wireless subsystem in the computing device.

Representative embodiments described herein can facilitate in-device coexistence between wireless subsystems by mitigating the effects of such RF coexistence interference conditions, which can improve performance of the wireless subsystems. In addition, embodiments described herein can facilitate in-device coexistence between high speed wired interfaces that can radiate RF interference and one or more wireless subsystems. In this regard, some embodiments provide an architecture and corresponding methods, apparatuses, and computer program products for facilitating in-device coexistence among multiple wireless subsystems, and between wired and wireless subsystems to mitigate radio frequency interference and to improve performance of the wireless subsystems in the computing device. In some embodiments, a host processor can be configured to define a coexistence policy for two or more wireless subsystems that can be implemented on a computing device. The host processor can provide the coexistence policy to the wireless subsystems via an interface between the host processor and the wireless subsystems. In an embodiment, the coexistence policy can include a set of states based on operating conditions for a set of wireless subsystems and at least one high-speed wired interface, each state including a set of operating configurations for one or more of the wireless subsystems.

In some embodiments, the wireless subsystems can be configured to exchange state information via a separate interface between the wireless subsystems. The interface between the wireless subsystems can be a higher speed interface, which can facilitate real time exchange of state information between the wireless subsystems. The state information can, for example, provide indications of inter-ference conditions experienced by a wireless subsystem, provide operating state information indicative of whether a wireless subsystem is transmitting or receiving data during a given time period, and provide operating configuration information about transmit and/or receive antenna and signal chain operations. State information that changes frequently and/or which requires low-latency communication (e.g., in real time or near real time) can be exchanged between wireless subsystems via an interface that can facilitate relatively high-speed communication between wireless subsystems. Some embodiments can partition information that can be used by a wireless subsystem to make a decision for controlling wireless subsystem operation to mitigate in-device interference into non-real time information that changes infrequently, such as a coexistence policy, and state information for the co-located wireless and wireless subsystems that can change more frequently. A coexistence policy and/or other non-real time information that can change infrequently can accordingly be communicated between a host processor and one or more wireless subsystems via a slower speed interface(s) and/or via a shared interface through which other information can be communicated without clogging a higher speed, direct interface that can directly link wireless subsystems. In some embodiments, wireless subsystems can share a common control processor through which coexistence policies and/or state information can be monitored and/or managed in conjunction with and/or independent of a host processor.

A wireless subsystem in accordance with some embodiments can use state information received from another wireless subsystem to control wireless subsystem operation in accordance with the coexistence policy provided by the host processor. In this regard, a wireless subsystem can have knowledge of conditions experienced by and/or activities being performed by a co-located wireless subsystem based on the state information and can use this knowledge to determine whether to modify wireless subsystem operation to mitigate interference with the co-located wireless subsystem in accordance with the coexistence policy at a given time. Thus, for example, an aggressor wireless subsystem, such as a Wi-Fi wireless subsystem, can know from the state information whether a victim wireless subsystem, such as a Bluetooth wireless subsystem, is configured to receive data in an overlapping frequency band with the aggressor wireless subsystem, and the aggressor wireless subsystem can take actions, e.g., configure itself, to reduce coexistence interference with the victim wireless subsystem.

Figure 2:
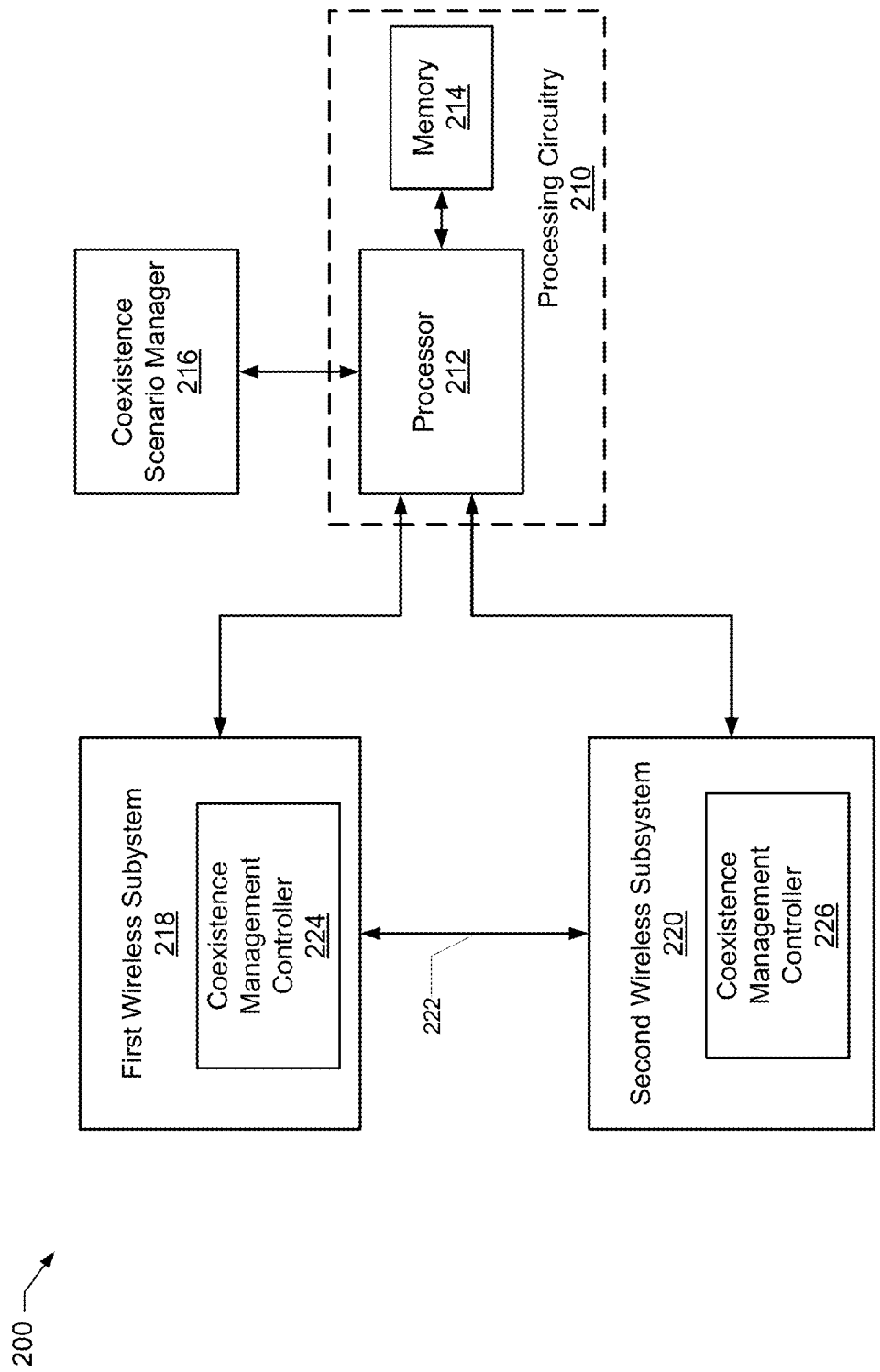
FIG. 2 illustrates a block diagram of elements of a computing device in accordance with some embodiments.

FIG. 2 illustrates a block diagram 200 of elements of a computing device in accordance with some embodiments. The computing device can be any device including two or more co-located wireless subsystems, which can enable the computing device to communicate via multiple wireless communication technologies. By way of non-limiting example, the computing device can be a mobile phone, a tablet computing device, a laptop computer, a desktop computer or other computing device that can include multiple wireless subsystems and a set of wired connection ports (not shown). It will be appreciated that the components, devices or elements illustrated in and described with respect to FIG. 2 may not be mandatory and thus some may be omitted in certain embodiments. Additionally, some embodiments can include further or different components, devices or elements beyond those illustrated in and described with respect to FIG. 2.

In some embodiments, the computing device can include processing circuitry 210 that is configurable to perform actions in accordance with one or more embodiments disclosed herein. The processing circuitry 210 can be configured to control performance of one or more functionalities of the computing device in accordance with various embodiments, and thus can provide means for performing functionalities of the computing device in accordance with various embodiments. The processing circuitry 210 may be configured to perform data processing, application execution and/or other processing and management services according to one or more embodiments. In some embodiments, the computing device or a portion(s) or component(s) thereof, such as the processing circuitry 210, can include one or more chips, or one or more chipsets. The processing circuitry 210 and/or one or more further components of the computing device can therefore, in some instances, be configured to implement an embodiment on a single chip or chipset. In some embodiments, the processing circuitry 210 can include a processor 212 and memory 214. The processing circuitry 210 can be in communication with or otherwise control a coexistence scenario manager 216 and two or more wireless subsystems that can be implemented on the computing device, including a first wireless subsystem 218 and second wireless subsystem 220.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), or a combination thereof. The processor 212 can be a host processor configured to serve as a host for controlling or otherwise facilitating operation of two or more wireless subsystems in the computing device, such as the first wireless subsystem 218 and second wireless subsystem 220. In some embodiments, the processor 212 can be an application processor. Although illustrated as a single processor, it will be appreciated that the processor 212 can include a plurality of processors. The plurality of processors can be in operative communication with each other and can be collectively configured to perform one or more functionalities of the computing device as described herein. In some embodiments, the processor 212 can be configured to execute instructions that can be stored in the memory 214 or that can be otherwise accessible to the processor 212. As such, whether configured by hardware or by a combination of hardware and software, the processor 212 is capable of performing operations according to various embodiments while configured accordingly.

In some embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. The memory 214 can be configured to store information, data, applications, and/or instructions for enabling the computing device to carry out various functions in accordance with one or more embodiments. In some embodiments, the memory 214 can be in communication with one or more of the processor 212, the coexistence scenario manager 216, the first wireless subsystem 218, or the second wireless subsystem 220 via a bus(es) for passing information among components of the computing device.

The computing device can further include a coexistence scenario manager 216, which can be embodied as various means, such as circuitry, hardware, a computer program product comprising a non-transitory computer readable medium (for example, the memory 214) storing computer readable program instructions executable by a processing device (for example, the processor 212), or a combination thereof. In some embodiments, the processor 212 (or the processing circuitry 210) can include, or otherwise control the coexistence scenario manager 216. The coexistence scenario manager 216 can be configured to define a coexistence policy for two or more wireless subsystems that can operate concurrently on the computing device, such as the first wireless subsystem 218 and second wireless subsystem 220, and can provide the coexistence policy to the wireless subsystems for implementation.

As noted, the computing device can include a plurality of co-located wireless subsystems. Two representative wireless subsystems are illustrated in FIG. 2. It will be appreciated, however, that the computing device can include one or more further wireless subsystems in some embodiments and can also include one or more high-speed wired interfaces, which can in some circumstances also radiate radio frequency energy that can cause interference with one or more wireless subsystems co-located in the computing device. The wireless subsystems implemented on the computing device can each implement a wireless communication technology such that two or more disparate wireless communication technologies can operate concurrently on the computing device. In some embodiments, one or more wireless subsystems on the computing device, such as one or more of the first wireless subsystem 218 or second wireless subsystem 220, can implement a wireless networking communications technology, such as Bluetooth, Zigbee, and/or other wireless personal area network (PAN) technology; and/or Wi-Fi and/or other wireless local area network (WLAN) communication technology. In some embodiments, the first wireless subsystem 218 or the second wireless subsystem 220 can implement a wireless communication technology that operates in an ISM band. It will be appreciated, however, that the foregoing example wireless subsystem technologies are provided by way of example, and not by way of limitation, as various example embodiments support in-device coexistence between any two (or more) wireless subsystems that use disparate wireless communication technologies.

An interface 222 can be used to interface two or more wireless subsystems, such as the first wireless subsystem 218 and second wireless subsystem 220, on the computing device. The interface 222 can be separate from an interface(s) between the processor 212 and the first wireless subsystem 218 and second wireless subsystem 220. The interface 222 can be a higher speed interface than the interface(s) between the wireless subsystems and processor 212, which can offer low latency to allow (e.g., on the order of microseconds) for communication of real time state information between wireless subsystems. The interface 222 can be an interface dedicated to the exchange of information between wireless subsystems of the computing device. In some embodiments, the interface 222 can be a direct interface linking the first wireless subsystem 218 and second wireless subsystem 220 (and potentially one or more further wireless subsystems). In some example embodiments, the interface 222 can be a Wireless Coexistence Interface (WCI), such as a WCI-2 interface, WCI-1 interface, or other type of WCI. It will be appreciated, however, that WCI interface types are but one example of an interface that can be used to facilitate communication of state information between wireless subsystems, and any appropriate interface that can be used to interface two or more wireless subsystems to support the exchange of state information between wireless subsystems can be used in addition to or in lieu of an WCI interface in accordance with some embodiments.

In some embodiments, wireless subsystems implemented on the computing device can include respective coexistence management controllers. For example, a first wireless subsystem coexistence management controller 224 can be implemented on the first wireless subsystem 218, and a second wireless subsystem coexistence management controller 226 can be implemented on the second wireless subsystem 220. The coexistence management controllers (e.g., the first wireless subsystem coexistence management controller 224 and the second wireless subsystem coexistence management controller 226) can be embodied as various means, such as circuitry, hardware, a computer program product comprising computer readable program instructions stored on a non-transitory computer readable medium that can be implemented on a wireless subsystem and executed by a processing device that can be implemented on a wireless subsystem, or a combination thereof.

The coexistence scenario manager 216 can be configured to define a coexistence policy for wireless subsystems implemented on the computing device, such as the first wireless subsystem 218 and second wireless subsystem 220. The coexistence policy can, for example define priority levels across device wireless subsystems, such as between Bluetooth and Wi-Fi. In this regard, the coexistence scenario manager 216 can maintain a "global" view of the priority levels across various wireless subsystems. In some embodiments, the coexistence scenario manager 216 can account for the operating state of various wired interfaces in addition to the wireless subsystems. In some embodiments, the coexistence policy can define operating states for one or more wireless subsystems based on the operating states of other co-located wireless subsystems and/or of co-located wired interfaces.

The coexistence scenario manager 216 can be configured to push the coexistence policy to the wireless subsystems 218/220 via an interface(s) between the processor 212 and the wireless subsystems 218/220. The interface(s) between the processor 212 and the first wireless subsystem 218 and second subsystem 220 can be a non-real time interface(s). Communication of a coexistence policy to the wireless subsystems can be event-triggered. A coexistence policy can be changed in response to event triggers such as in response to user activity.

Implementation and execution of a coexistence policy can be performed by the coexistence management controllers 224/226 on the wireless subsystems 218/220 based on coordination amongst the wireless subsystems 218/220 via the interface 222. The coexistence management controllers (e.g., the first radio coexistence management controller 224 and the second radio coexistence management controller 226) can be configured to perform measurements and exchange state information between the wireless subsystems 218/220 via the interface 222. The state information exchanged, in some embodiments, can include an indication of an interference condition experienced by a wireless subsystem, an operating state or configuration for a wireless subsystem, and/or other information that can be used by a coexistence management controller to determine whether to modify operation of the wireless subsystem to mitigate interference with another wireless subsystem in accordance with a coexistence policy.

A coexistence management controller, such as the coexistence management controller 224 of the first wireless subsystem 218 and the coexistence management controller 226 of the second wireless subsystem 220, can perform real-time actions to control operations of a wireless subsystem based on a coexistence policy defined by the coexistence scenario manager 216 and based on state information that can be provided by a co-located wireless subsystem or wireless subsystem measurements. The coexistence management controller can determine whether to take corrective action to mitigate interference between co-located wireless subsystems in accordance with a coexistence policy.

In some embodiments, a coexistence management controller can be configured to modify transmission filtering for aggressor wireless subsystem transmissions to reduce interference with a victim wireless subsystem. A coexistence management controller, in some embodiments, can be configured to adjust a linearity of RF components of an aggressor wireless subsystem to mitigate the effects of intermodulation distortion and/or harmonic distortion interference with a victim wireless subsystem. A coexistence management controller can be configured to apply time domain sharing to mitigate the effects of interference between wireless subsystems. In this regard, if a victim wireless subsystem has a lower priority than an aggressor wireless subsystem, the coexistence management controller of the victim wireless subsystem can avoid receiving data when an aggressor wireless subsystem transmits. The coexistence management controller on the victim wireless subsystem can know whether the aggressor wireless subsystem transmits at a given time or within a shared frequency band based on state information that can be provided by the aggressor wireless subsystem (e.g., via interface 222) and/or based on measurements that can be performed by the victim wireless subsystem (i.e., by detecting an interference condition). In some embodiments, if a victim wireless subsystem has a higher priority than an aggressor wireless subsystem during a particular time period, the coexistence management controller on the aggressor wireless subsystem can avoid transmitting data during the particular time period.

In some embodiments, a coexistence management controller can be configured to mitigate interference by adjusting frequencies used for transmission and/or for reception by one or more wireless subsystems. For example, a coexistence management controller on a victim wireless subsystem can be configured to avoid reception on one or more frequency channels affected by aggressor wireless subsystem's transmissions. The coexistence management controller on the victim wireless subsystem can know of one or more frequency channels affected by an aggressor wireless subsystem's transmissions based on measurements that can be performed by the victim wireless subsystem. The frequency channel(s) affected by the aggressor wireless subsystem's transmissions can in a shared or overlapping frequency band. A coexistence management controller on an aggressor wireless subsystem can avoid transmission on one or more frequency channel(s) that can affect a victim wireless subsystem. In some embodiments, the coexistence management controller on the aggressor wireless subsystem can be configured to exclude transmissions on certain frequency channels or portions of a frequency band when the victim wireless subsystem is configured to receive transmissions that can be affected. In some embodiments, the coexistence management controller of the aggressor wireless subsystem has knowledge of configurations or operating states of the victim wireless subsystem.

A coexistence management controller of a wireless subsystem, in some embodiments, can be configured to modify transmission power levels to mitigate interference with other co-located wireless subsystems. A coexistence management controller on an aggressor wireless subsystem can modify transmit power levels when concurrent reception by a victim wireless subsystem can occur or be expected to occur. The aggressor wireless subsystem can back off a transmit power level depending on priority levels established between different wireless subsystems in the computing device and/or based on data throughput requirements of applications that use one or more of the wireless subsystems and/or based on other operating states or measured operating conditions. The aggressor wireless subsystem can modify use of one or more parallel transmit signal chains, e.g., when each signal chain is associated with a distinct antenna and each transmission via each distinct antenna can interfere with reception by a victim wireless subsystem differently. In some embodiments, a subset of antennas can be used for transmission, transmit power levels on each antenna can be modified, particular types of signals transmitted on each antenna, or other modifications of transmit signals applied to different antennas can be used to mitigate interference for transmissions of an aggressor wireless subsystem into a concurrently operating victim wireless subsystem.

Figure 3:
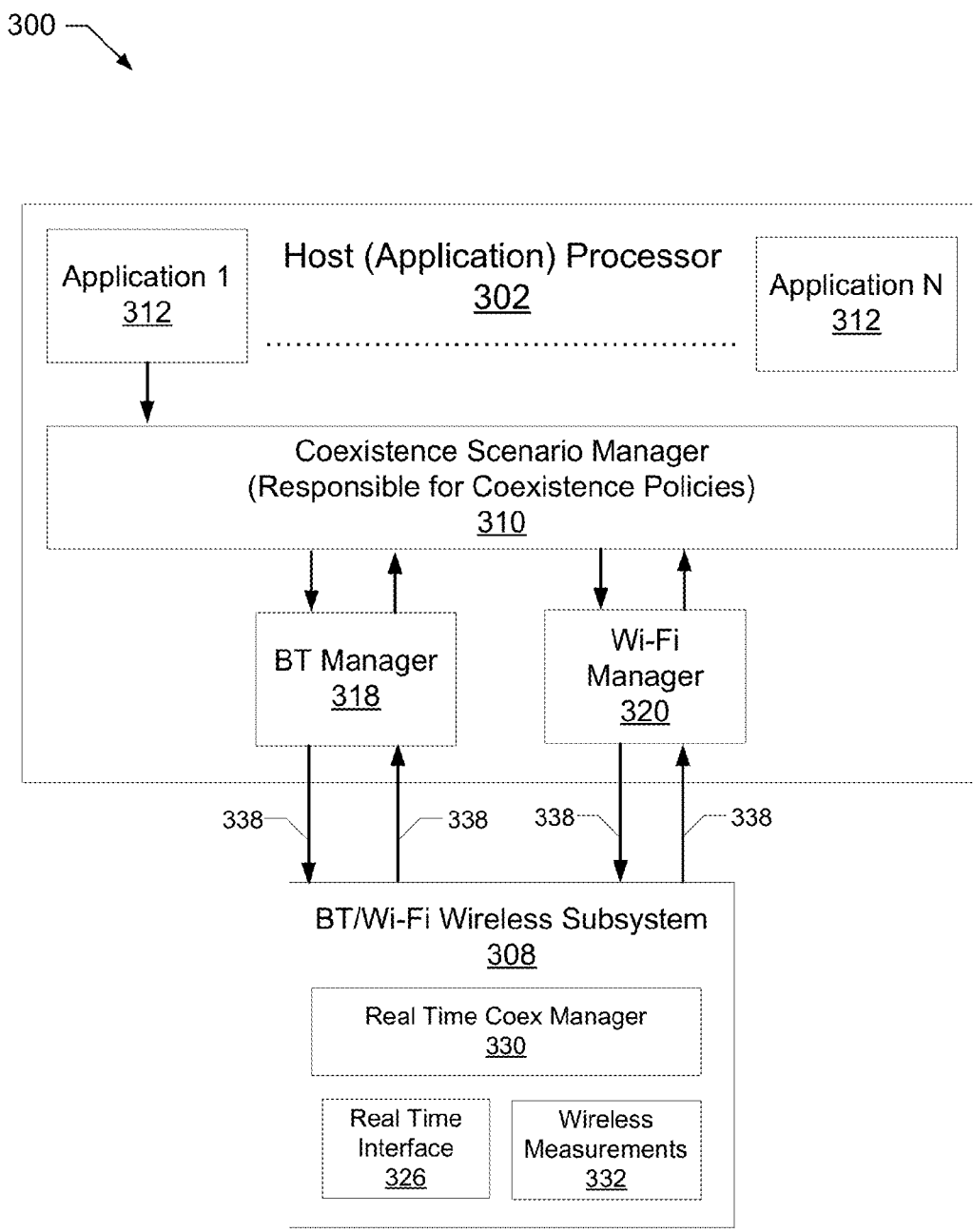
FIG. 3 illustrates an architecture for facilitating in-device coexistence between wireless subsystems in accordance with some embodiments.

FIG. 3 illustrates a diagram 300 of a representative architecture for facilitating in-device coexistence between wireless subsystems in accordance with some embodiments. The architecture can include a Host Processor 302, which can be embodied as an application processor. The Host Processor 302 of FIG. 3 can be the processor 212 and/or a portion of processing circuitry 210 illustrated in FIG. 2, in some embodiments. The architecture can further include one or more wireless subsystems. The architecture can include a combination Bluetooth (BT)/Wi-Fi wireless subsystem 308

(which in some embodiments can be two separate wireless subsystems). In some embodiments, the architecture can include one or more wireless subsystems in addition to or in lieu of the wireless subsystems illustrated in and described with respect to FIG. 3. The use of a BT/Wi-Fi combo wireless subsystem is by way of example, and some embodiments can include a standalone Bluetooth wireless subsystem and/or a standalone Wi-Fi subsystem. As such, it will be appreciated that the architectural structure and corresponding techniques illustrated in and described with respect to FIG. 3 can be applied mutatis mutandis to any combination of wireless subsystems that can be implemented on a computing device.

The HOST Processor 302 can include a coexistence scenario manager 310, which can be responsible for defining coexistence policies for the device wireless subsystems and for providing the coexistence policies to the device wireless subsystems. In this regard, the coexistence scenario manager 310 can, for example, be an embodiment of the coexistence scenario manager 216. One or more applications 312 can run on the HOST Processor 302. The coexistence scenario manager 310 can accordingly have knowledge of application(s) 312 that are active at a given time. In some embodiments, the coexistence scenario manager 310 can determine state information for active applications. The coexistence scenario manager 310 can leverage knowledge of a state of applications 312 to derive a global view of usage of the computing device and determine a present operating state for the computing device. The coexistence scenario manager 310 can be configured to define a coexistence policy for the wireless subsystems of the computing device based at least in part on a present operating state. The coexistence policy can include a definition of one or more priorities between wireless subsystems with respect to the present operating state and/or based on one or more additional operating states in which the computing device can be placed. In some embodiments, the coexistence scenario manager 310 can monitor information provided by one or more wireless subsystems and one or more wired interfaces to determine an operating state of the computing device. Based on the determined operating state, the coexistence scenario manager 310 can provide information, settings, configurations, and/or policies to one or more of the wireless subsystems to configure them to mitigate interference that can occur.

The coexistence scenario manager 310 can be configured to provide a defined coexistence policy to the wireless subsystems of the computing device via respective management intermediaries that can be implemented on the HOST 302. For example, A BT manager 318 can facilitate communication between the coexistence scenario manager 310 and the BT portion of the BT/Wi-Fi combo wireless subsystem 308. Similarly, a Wi-Fi manager 320 can facilitate communication between the coexistence scenario manager 310 and the Wi-Fi portion of the BT/Wi-Fi combo wireless subsystem 308.

The coexistence scenario manager 310 can be configured to use an interface(s) 338 to provide a coexistence policy to the wireless subsystems (e.g., via the respective radio manager intermediaries 318/320). The interface(s) 338 can be non-real time interface(s), which can be used for large message transfers, and which may have a delay on the order of milliseconds. The interface(s) 338 of some example embodiments can be shared by components of a computing device in addition to the HOST 302 and one or more wireless subsystems, e.g., wireless subsystem 308, and can be used for the communication of data in addition to coexistence policies and/or other information that can be exchanged between the HOST 302 and wireless subsystems contained in the computing device.

The BT/Wi-Fi wireless subsystem 308 can include a real time coexistence (coex) manager 330, which can be configured to implement and execute a coexistence policy defined by the coexistence scenario manager 310. In this regard, the real time coex manager 330 can, for example, be an embodiment of a coexistence management controller (e.g., the coexistence management controller 224 or coexistence management controller 226) described with respect to FIG. 2. The real time coex manager 330 can be configured to use wireless measurements 332 that can be made by the wireless subsystem 308 and/or state information received from other wireless subsystems via a real time interface 326 to make control decisions for controlling the wireless subsystem 308 in accordance with the coexistence policy so as to mitigate interference within the wireless subsystem 308 and between wired interfaces and the wireless subsystem 308.

The real time interface 326 can provide for low latency communication, such as a delay on the order of microseconds, to allow for communication of real time state information between wireless subsystems to facilitate coordination in accordance with a coexistence policy defined and handed down by the coexistence scenario manager 310. In some example embodiments, the real time interface 326 can be a WCI interface, such as a WCI-2 interface or WCI-1 interface. The real time interface 326 of some example embodiments can be an interface dedicated to the exchange of information between wireless subsystems, which may not be used for communication of information to or from other components of the computing device.

The real time coex manager 330 can be further configured to provide state information of the BT/Wi-Fi combo radio 308 to other wireless subsystems (not shown) via the real time interface 326. The state information can include any information about a state of the BT/Wi-Fi combo radio 308 that can be used by other wireless subsystems to make determinations for operation in compliance with a coexistence policy defined by the coexistence scenario manager 310. The real time coex manager 330 can also obtain information from other wireless subsystems that can include state information that can influence decisions about operating states of the BT/Wi-Fi wireless subsystem 308 to mitigate interference.

Figure 4:
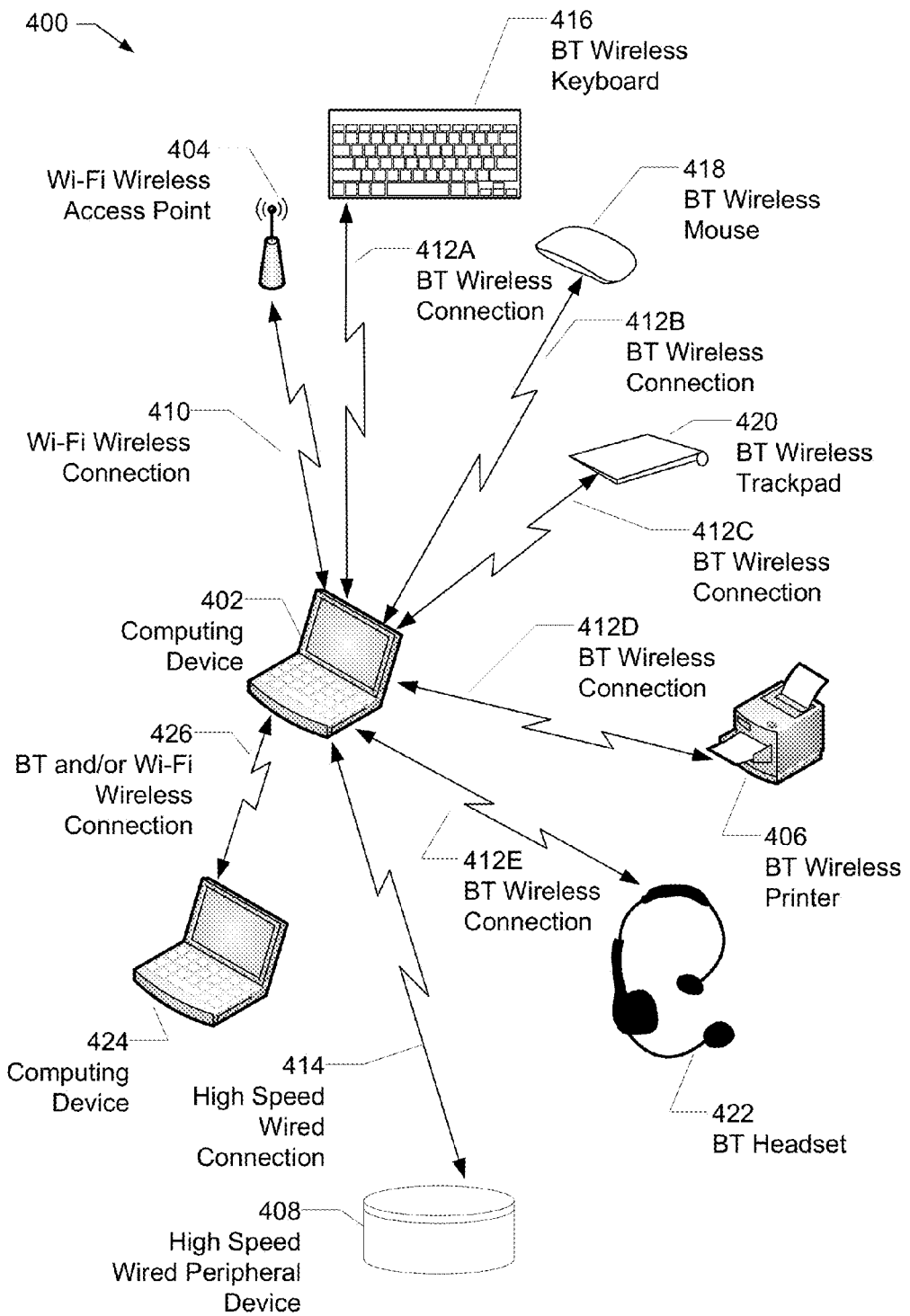
FIG. 4 illustrates a representative system of devices on which representative embodiments can be implemented to facilitate in-device coexistence between wireless subsystems.

FIG. 4 illustrates a representative system 400 in which some embodiments can be implemented to facilitate in-device coexistence between a set of interfaces that use wired and wireless communication technologies. The system 400 can include a computing device 402, which can, for example, be an embodiment of computing device 200. The computing device 402 can be configured to communicate using one or more different wireless technologies, e.g., using a wireless local area networking interface to establish a Wi-Fi wireless connection 410 with a Wi-Fi wireless access point 404. (Similarly, the computing device 402 can act as an access point to which additional client devices can connect via a Wi-Fi wireless connection 410.) The computing device 402 can also include a Bluetooth (BT) interface and can communicate with one or more peripheral devices through a BT wireless connection 412, e.g., forming a piconet or other comparable wireless personal area network (WPAN). The computing device 402 can connect to a set of one or more human interface devices (HIDs) using BT wireless connections 412. As illustrated, the computing device 402 can connect with a BT wireless keyboard 416 via a BT wireless connection 412A, with a BT wireless mouse 418 via a BT wireless connection 412B, with a BT wireless trackpad 420 via a BT wireless connection 412C, with a BT wireless printer 406 via a BT wireless connection 412D, and/or with a BT headset 422 via a BT wireless connection 412E. In some embodiments, the BT wireless connection 412E can operate as a synchronous connection-oriented (SCO) link, e.g., to support an audio interface, and/or operate based on an advanced audio distribution profile (A2DP). The set of BT wireless connections 412 A/B/C/D/E, or any subset thereof, will be referred to simply as the BT wireless connection 412 further herein. In some embodiments, the computing device 402 can be connected through a BT and/or Wi-Fi wireless connection 426 to another computing device 424, e.g., when the computing device 402 acts as an AP or as part of an ad hoc wireless network. The computing device 402 can also include one or more different high-speed wired interfaces through which different peripheral devices can connect with the computing device 402. In a representative embodiment, the computing device 402 can connect to a high speed wired peripheral device 408 via a high speed wired connection 414. The high speed wired connection 414 can operate in accordance with one of a number of high speed wired communication protocols, e.g., as a universal serial bus (USB), as an IEEE Ethernet connection, as a Thunderbolt connection, as an IEEE Firewire connection, or as a high definition multimedia interface (HDMI) connection. In some embodiments, the high speed wired connection 414 can operate in different modes that transfer data at different speeds between the computing device 402 a connected peripheral device, that use different frequency bands, and/or that radiate different amounts of radio frequency interference. In some embodiments, one or more components of the computing device 402 can monitor states of the high speed wired connection 414 to determine an active and/or a predicted operating state in which radio frequency interference can be generated by the high speed wired connection 414 and impact performance of one or more of the wireless connections 410/412. In some embodiments, one or more components of the computing device 402 can monitor operating states of each of the wireless subsystems that support the wireless connections 410/412 to determine actual or predicted radio frequency interference between the wireless subsystems and can take appropriate actions to mitigate the interference. The Wi-Fi wireless connection 410 can operate in different frequency bands, some of which can overlap with a frequency band used by a Bluetooth (BT) wireless connection 412. Depending on transmit power levels, transmission times, radio frequency channels used, and number of parallel transmissions (e.g., MIMO modes), control circuitry in the computing device 402, (e.g., a host processor 302, one or more wireless managers 318/320, a coexistence scenario manager 310, and/or a real time coexistence manager 330 as shown in FIG. 3), can modify Wi-Fi transmissions of the Wi-Fi wireless connection 410 to mitigate interference with the BT wireless connection 412. Similarly BT reception can be modified to minimize levels of interference received. In some embodiments, the control circuitry in the computing device can modify operations of the Wi-Fi circuitry that provides for the Wi-Fi wireless connection 410 and/or the BT circuitry that provides for the BT wireless connection 412 based on connected states and/or operational states of one or more high speed wired interfaces that support one or more high speed wired connections 414. The control circuitry of the computing device 402 can recognize operating states for the high speed wired connection 414 that can interfere with transmission and/or reception of Wi-Fi signals on the Wi-Fi wireless connection 410 and/or with the transmission and/or reception of BT signals on the BT wireless connection 412. The control circuitry can take actions that mitigate expected or actual interference as described further herein.

Figure 5:
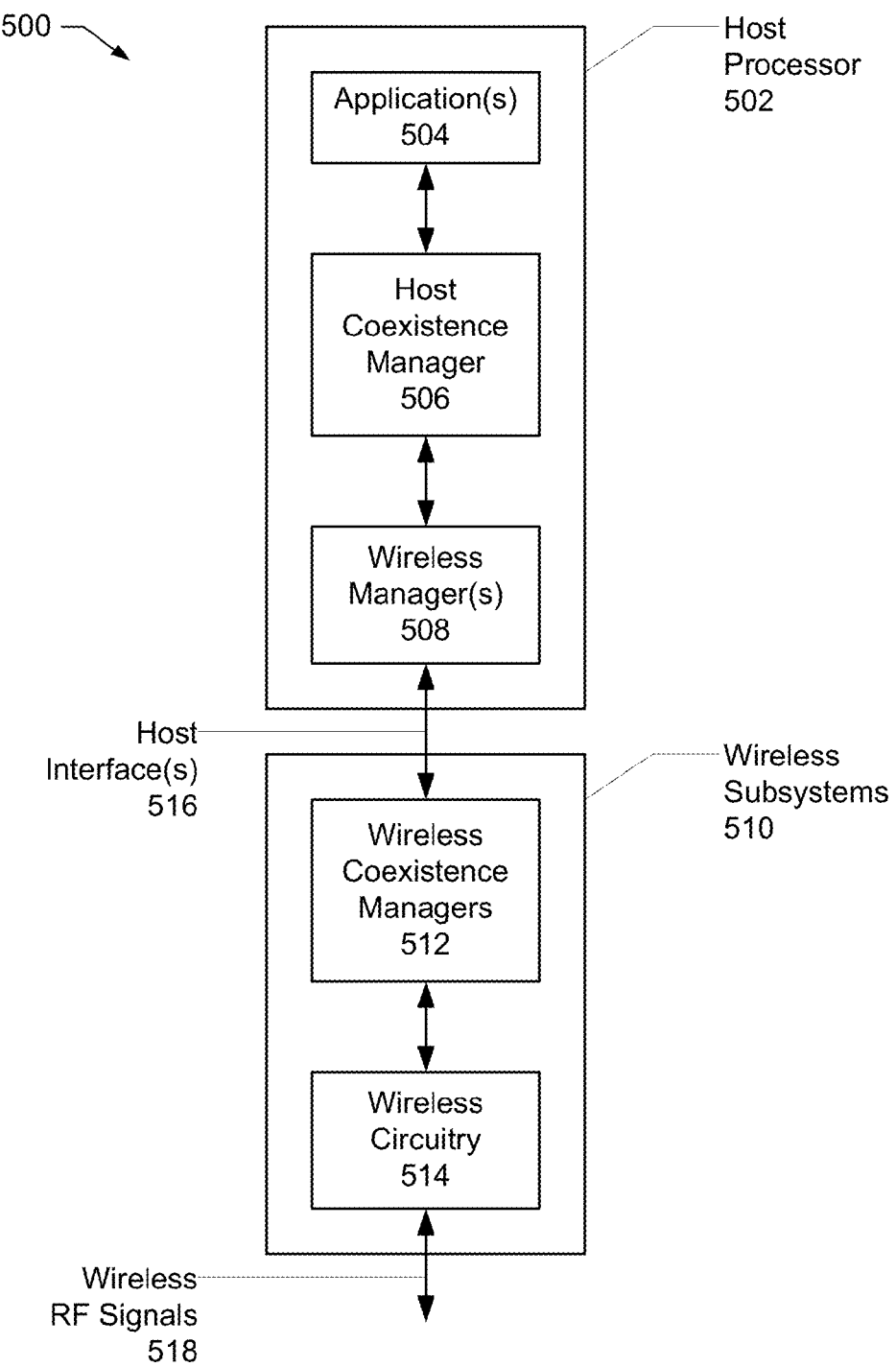
FIG. 5 illustrates a representative block diagram for a set of components in a computing device in accordance with some embodiments.

FIG. 5 illustrates a representative block diagram 500 for a set of components in a computing device 402 in accordance with some embodiments. The set of components illustrated in FIG. 5 can encompass the architecture 300 illustrated in FIG. 3 in some embodiments. The computing device 402 can include a host processor 502 and one or more wireless subsystems 510. The host processor 502 can couple to the wireless subsystems 510 through one or more host interfaces 516. A representative host interface 516 can include the non-real-time interface 338 described hereinabove that couples wireless subsystem managers 318/320 operating in the host processor 502, which can also be in some embodiments the host processor 302, to one or more wireless subsystems (radios) 308. The host processor 502 can, in some embodiments, perform operations of an applications processor in the computing device 402, e.g., executing one or more applications 504 thereon. The applications 504 can generate signaling commands and data packets to communicate over one or more wireless networks using one or more of the wireless subsystems 510. The applications 504 can also receive signaling commands, e.g., from a host coexistence manager 506 or other control functions operational in the host processor 502, and consume data packets received through the one or more wireless subsystems 510. The host coexistence manager 506 in the host processor 502 can obtain configurations of one or more wireless subsystems 510 and can evaluate whether the configurations indicate a potential or actual coexistence interference condition between two or more of the wireless subsystems 510. In some embodiments, the host coexistence manager 506 can determine modifications to one or more parameters for the configurations of one or more of the wireless subsystems 510 to mitigate interference between them. The host coexistence manager 506 in cooperation with one or more wireless managers 508 operational in the host processor 502 can provide configuration parameters to the one or more wireless subsystems 510 in order to monitor link quality and/or to manage interference between each of the wireless subsystems 510. One or more wireless coexistence managers 512 operational in the one or more wireless subsystems 510 can receive information, requests, and/or commands from the host coexistence manager 506, e.g., via the wireless managers 508, and can adjust operational parameters of wireless circuitry 514 in their respective wireless subsystems 510 to balance link quality for communications through the wireless subsystems 510. In some embodiments, the host processor, e.g., the host coexistence manager 506 provides information to one or more wireless managers 508 about the operating state of one or more different wired interfaces, e.g., high speed wired interfaces that support one or more high speed wired connections 414. The wireless managers 508 can provide the information and/or configuration commands to wireless managers 512 of wireless subsystems 510 that can be affected by interference generated by the wired interfaces. The wireless managers 508 and the wireless coexistence managers 512 can operate in concert to minimize the effect of radio frequency interference from co-located high-speed wired interfaces in addition to assisting in the management of radio frequency interference between wireless subsystems 510.

In some embodiments, the host processor 502 defines a coexistence policy including coexistence parameters, which are provided to the wireless subsystems 510. The host interface 516 between the wireless subsystems 510 and the host processor 502 can operate in "non-real-time" relative to changing operational conditions of the wireless radio frequency (RF) signals 518 transmitted and received by the wireless circuitry 514 of the wireless subsystems 510. In some embodiments, the wireless subsystems 510 are interconnected to each other (or to a subset of each other) through one or more "real-time" interfaces that can provide information on an operational state and/or link quality conditions in "real time" to each of the wireless subsystems 510 for wireless RF signals 518 received by the wireless subsystems 510. In some embodiments, a wireless subsystem 510 monitors wireless RF signals 518 received in real time by the wireless subsystem 510, e.g., based on link quality parameters provided by the host processor 502, and can provide information about the link quality to the host processor 502 in "non-real-time" as well as to other wireless subsystems 510 in "real time." Thus, the wireless subsystems 510 can exchange real time wireless radio frequency signal and configuration information between themselves and can provide "summary" information in non-real-time to the host processor. Each of the wireless subsystems 510 can undertake various actions to mitigate interference of wireless RF signals 518 transmitted by the wireless subsystems 510 that can be received by other wireless subsystems 510 in the computing device 402. A wireless subsystem 510 can receive requests to modify wireless RF signals 518 from the host processor 502, e.g., from the host coexistence manager 506 via a wireless manager 508, and from another wireless subsystem 510, e.g., from another wireless coexistence manager 512 therein. The wireless subsystem 510 receiving the requests can determine an appropriate set of actions to undertake that balances link quality, performance, and/or stability for communication of wireless RF signals 518 for itself and mitigating interference into other wireless subsystems 510 of the computing device 402.

Figure 6A:
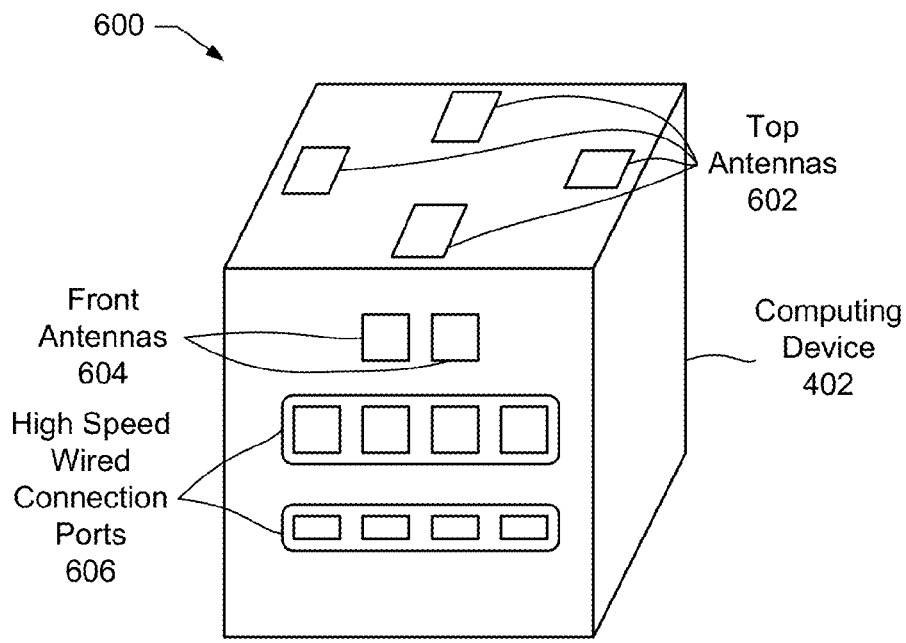
FIGS. 6A and 6B illustrate representative placement of wired and wireless subsystem components in a computing device in accordance with some embodiments.
Figure 6B:
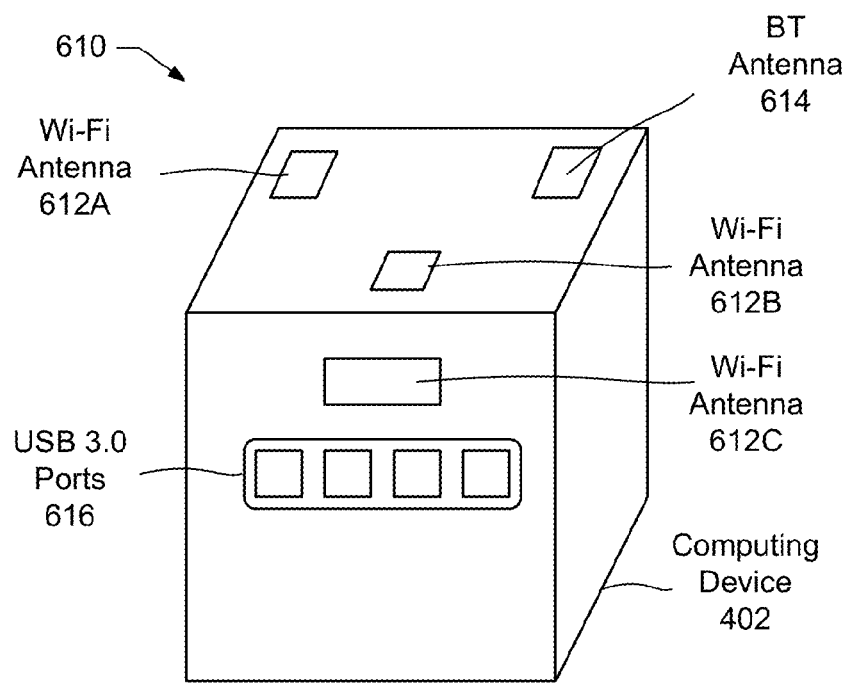

FIGS. 6A and 6B illustrate diagrams 600/610 of representative placements for a set of wired interfaces and for select components of one or more wireless subsystems 510 in a computing device 402 in accordance with some embodiments. FIG. 6A illustrates a diagram 600 of a generic version of the computing device 402 that includes a set of wireless subsystem 510 components (e.g., antennas 602/604) as well as a set of high-speed wired connection ports 606. As would be understood by a person of ordinary skill, a computing device 402 can include multiple wireless subsystems 510, which can have associated antennas placed at different locations to transmit and receive radio frequency signals, as well as multiple high speed wired connection ports 606, which can also be situated at a variety of locations in order to connect to peripheral devices. The placement of the antennas 602/604 and the high speed wired connection ports 606 can be constrained, at least in part, by the exterior physical design of the computing device 402 and/or by the placement of interior physical components (e.g., circuit boards) within the computing device 402. The computing device 402 can, in some embodiments, provide a high performance computing platform that includes multiple high-speed wired connection ports 606 by which to interconnect the computing device 402 to external peripheral devices 408 and also a set of one or more wireless subsystems 510 through which to interconnect the computing device 402 to various additional peripheral devices. The computing device 402 can be designed to fit within a particular form factor that can affect the placement of the high-speed wired connection ports 606 relative to one or more antennas used alone or in combination for wireless communication by the one or more wireless subsystems 510. The computing device 402 can include one or more different sets of high-speed wired connection ports 606, some of which can be positioned adjacent to one or more antennas (or to other radio frequency sensitive circuitry) of the one or more wireless subsystems 510. As illustrated by diagram 600, a computing device 402 can include a set of antennas 604 placed along one face of the computing device 402 and a second set of antennas 602 placed along another face of the computing device 402. The front antennas 604 can be in close proximity to one or more high-speed wired connection ports 606. In some embodiments, the high-speed wired connection ports 606 can radiate radio frequency interference in a frequency band that can interfere with the operation of one or more of the wireless subsystems 510 that receive and/or transmit signals through one or more of the front antennas 604. In an embodiment, the high-speed wired connection ports 606 (or a portion thereof) can be configured to operate according to different wired communication protocols, some of which can result in radio frequency interference into one or more of the front antennas 604, while others of which may not result in radio frequency interference into the front antennas 604. The computing device 402 can include control circuitry, e.g., a host processor, 502, a host coexistence manager 506, a set of wireless managers 508, and/or one or more wireless coexistence managers 512, which can monitor configurations of the high speed wired connection ports 606 (or a portion thereof) and also configurations of the wireless subsystems 510. In some embodiments, the control circuitry (e.g., a processor) can adjust wireless circuitry of the wireless subsystems 510, e.g., by providing information and/or control signals to modify operation of the wireless subsystems 510 that can receive and/or transmit radio frequency signals via one or more of the front antennas 604 that can be affected by coexistence interference. In some embodiments, a wireless subsystem 510 can use multiple antennas for transmission and/or for reception and can modify which antennas are used to mitigate coexistence interference, e.g., use only top antennas 602 in conditions when radio frequency interference into the front antennas 604 can occur. The wireless subsystem 510 can, in some embodiments, flexibly select to use or not use a set of antennas, e.g., the front antennas 604, for transmission only rather than reception when radio frequency coexistence interference from co-located adjacent (and/or nearby) high-speed wired connection points 606 can occur. The wireless subsystem 510 can also choose to modify other communication characteristics of a wireless subsystem 510 that can experience radio frequency coexistence interference, e.g., by changing data rates, modulation and coding schemes, diversity schemes, or other physical layer characteristics to combat effects of radio frequency coexistence interference.

FIG. 6B illustrates a diagram 610 of a specific version of the computing device 402 that includes particular placement of a set of antennas 612A/B/C/614 used by two wireless subsystems 510 of the computing device 402 and a set of particular high-speed wired connection ports, namely USB 3.0 ports 616 used by the computing device 402. In some embodiments, as illustrated by diagram 610, the computing device 402 includes a first wireless subsystem 510, which operates in accordance with a Bluetooth wireless communication protocol, and a second wireless subsystem 510, which operates in accordance with a Wi-Fi wireless communication protocol. The computing device 402 can also include high-speed universal serial bus (USB) connection ports 616, which can be configured to operate in accordance with a high-speed USB 3.0 wired communication protocol. The high-speed USB 3.0 ports 616 can also operate in accordance with legacy USB protocols (e.g., 1.X and/or 2.X) in addition to USB 3.X protocols depending on which protocols are supported by one or more external devices connected to the USB 3.0 connection ports 616. In an embodiment, the computing device 402 can communicate using a Wi-Fi communication protocol through multiple antennas, e.g., using a set of antennas that include different antennas placed on different faces of the computing device 402. To minimize coexistence interference between the USB 3.0 ports 616 and the first wireless subsystem 510 that operates in accordance with the Bluetooth protocol, the computing device 402 can be configured to use an antenna, e.g., BT antenna 614, positioned furthest from the USB 3.0 ports 616 rather than an antenna, e.g., Wi-Fi antenna 612C, positioned closest to the USB 3.0 ports. The physical distance separation of the BT antenna 614 from the USB 3.0 ports 616 can provide a measure of radio frequency signal attenuation that can ameliorate at least in part effects of radio frequency interference emitted by the USB 3.0 ports 616 (when connected to one or more external devices that operate according to a USB 3.0 communication protocol) that can leak into the radio frequency channel band used by the BT antenna 614 to receive signals for a BT wireless subsystem 510. It should be understood that USB 3.0 ports 616 are provided as representative non-limiting example of high-speed wired connection ports, and that other high-speed wired connection ports 606 that use other communication protocols can also generate radio frequency interference that can affect performance of one or more of the wireless subsystems 510 in the computing device 402.

The computing device 402 can include a Wi-Fi wireless subsystem 510 that can operate using one or more antennas in one or more different modes, e.g., single-input single-output (SISO), single-input multiple-output (SIMO), multiple-input single-output (MISO), or multiple-input multiple-output (MIMO) modes. In a representative embodiment, the computing device 402 includes a set of three Wi-Fi antennas 612A/B/C that can be configured for transmit and/or receive operation alone or in combination. In some embodiments, the Wi-Fi wireless subsystem 510 can selectively use a subset of the Wi-Fi antennas 612A/B/C in different configurations of transmit and/or receive modes to mitigate coexistence interference into other wireless subsystems and/or to minimize effects of radio frequency interference received by the Wi-Fi antennas 612A/B/C. In an embodiment, under certain operating conditions, the Wi-Fi wireless subsystem 510 transmits a set of messages, e.g., data, signaling, control, and/or management messages, using one antenna, e.g., the Wi-Fi antenna 612C, which can be at a greater distance from the BT antenna 614 than the remaining Wi-Fi antennas 612A/B. The Wi-Fi wireless subsystem 510 can select to use one antenna or multiple antennas to transmit based on a level of radio frequency interference that can affect performance of the Bluetooth wireless subsystem 510, e.g., as indicated by information provided by the Bluetooth wireless subsystem 510 directly to the Wi-Fi wireless subsystem 510 or indirectly, e.g., through common control circuitry and/or a host processor 502. In some embodiments, the Wi-Fi wireless subsystem 510 can determine a set of antennas to use for transmission and/or reception based on a frequency band used by a particular Wi-Fi communication protocol. For example, when operating in a frequency band that overlaps with a frequency band used by the Bluetooth wireless subsystem 510, the Wi-Fi wireless subsystem 510 can reduce coexistence interference into the co-located Bluetooth wireless subsystem 510 by using fewer antennas than when operating in a non-overlapping frequency band. In some embodiments, the Wi-Fi wireless subsystem 510 can be configured a priori with information about antenna isolation between different antennas and can use the isolation information to estimate radio frequency interference into the BT wireless subsystem 510 in different operating modes.

Figure 7:
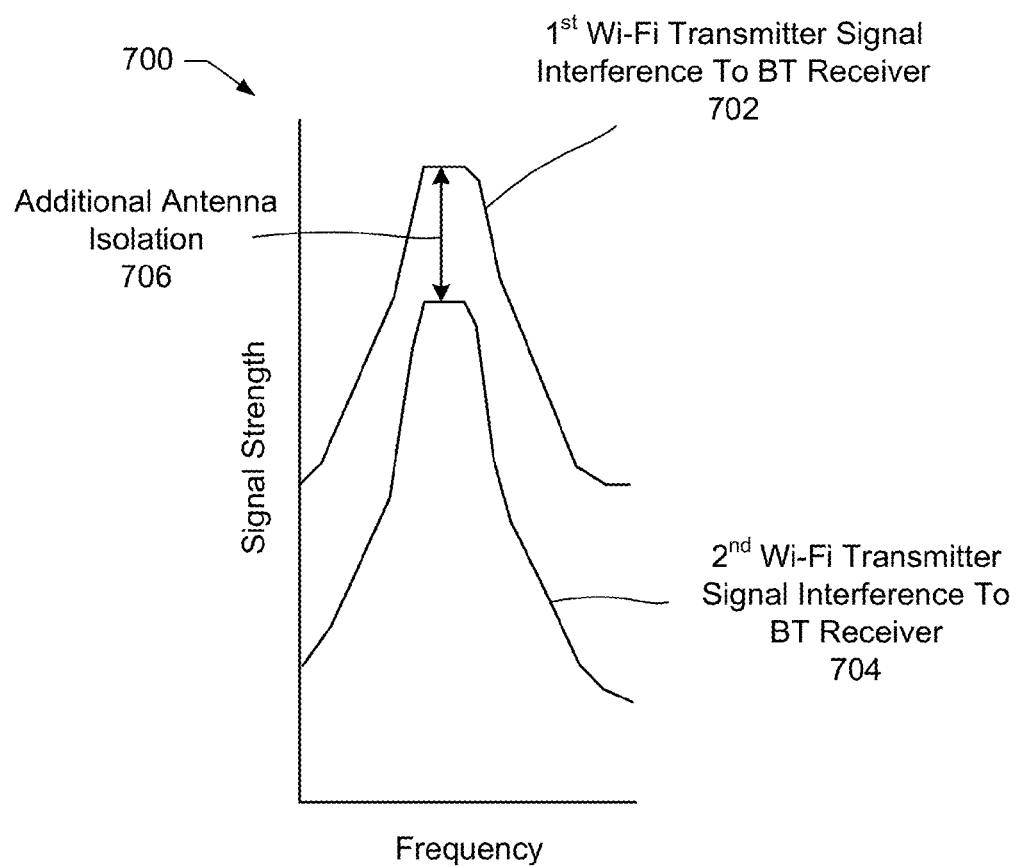
FIG. 7 illustrates signal interference power spectral density diagrams in accordance with some embodiments.

FIG. 7 illustrates a representative diagram 700 of different levels of radio frequency interference signal strength received by a Bluetooth receiver (e.g., via the BT antenna 614) from different antennas of a Wi-Fi transmitter (e.g., via Wi-Fi antennas 612 A/B C). The plots in the diagram 700 can represent a power spectral density of received Wi-Fi radio frequency interference received by the Bluetooth receiver. Different Wi-Fi transmit antennas 612 A/B/C can be positioned at different distances and/or in different orientations with respect to the BT antenna 614 for the computing device 402. A first Wi-Fi antenna (e.g., Wi-Fi antenna 612A or 612B) can result in a higher level of radio frequency coexistence interference into the BT receiver (via BT antenna 614) based at least on the proximity between them than via a second Wi-Fi antenna (e.g., Wi-Fi antenna 612C). A high level of received radio frequency signal interference is represented by plot 702, while a lower level of received radio frequency signal interference is represented by plot 704. A position of the antenna 612C relative to the BT antenna 614 can provide an additional amount of radio frequency antenna isolation 706 compared with antennas 612A or 612B, which can be positioned more closely to the BT antenna 614. In some embodiments, an additional amount of antenna isolation can permit use of the "distant" Wi-Fi antenna 612C in conjunction with BT reception via the BT antenna 614 (depending on a level of signal strength received by the BT wireless subsystem 510 relative to the received Wi-Fi interference). In some embodiments, Wi-Fi transmission and BT reception can occur simultaneously during overlapping time periods only when the Wi-Fi and BT wireless subsystems 615 operate in different radio frequency channel bands, e.g., the Wi-Fi wireless subsystem 510 can operate in a 5.0 GHz frequency band while the BT wireless subsystem 510 can operate in a 2.4 GHz frequency band. In some embodiments, Wi-Fi transmission in a 2.4 GHz frequency band can occur at the same time as BT reception in the 2.4 GHz band only when sufficient antenna isolation between the wireless subsystems is achieved, e.g., use of a "distant" Wi-Fi antenna 612C can be allowed, while use of "near" Wi-Fi antennas 612A/B can be disallowed (or modified). In some embodiments, the BT wireless subsystem 510 can provide real-time information to the Wi-Fi wireless subsystem 510 that can be used to manage transmissions to mitigate coexistence interference of the Wi-Fi wireless subsystem 510 into the BT wireless subsystem 510. The BT wireless subsystem 510 can maintain a target bit error rate (BER), block error rate (BLER), and/or packet error rate (PER) and can provide information to the Wi-Fi wireless subsystem 510 in order to achieve one or more of the target error rates. In some embodiments, the Wi-Fi wireless subsystem 510 can modify wireless circuitry to mitigate coexistence interference by restricting a set of antennas used, altering a power level for transmissions from the antennas, configuring a type of transmission from the antennas used, setting a particular configuration of transmit diversity used, or restricting transmissions to a set of particular messages (e.g., signaling only, control messages only, management messages only, a set of particular control messages only) in order to mitigate coexistence interference of Wi-Fi transmissions into the BT wireless subsystem 510. In an embodiment, the Wi-Fi wireless subsystem 510 can be configured to use particular antennas for transmitting acknowledgement messages when using a radio frequency band that overlaps with the BT wireless subsystem 510. In an embodiment, the Wi-Fi wireless subsystem 510 can use the "distant" Wi-Fi antenna 612C for transmissions and the "close" Wi-Fi antennas 612 A/B for reception of wireless signals when operating in a radio frequency band that can overlap with the BT wireless subsystem 510 or can otherwise result in wireless radio frequency coexistence interference between the wireless subsystems 510 of the computing device 402.

Figure 8:
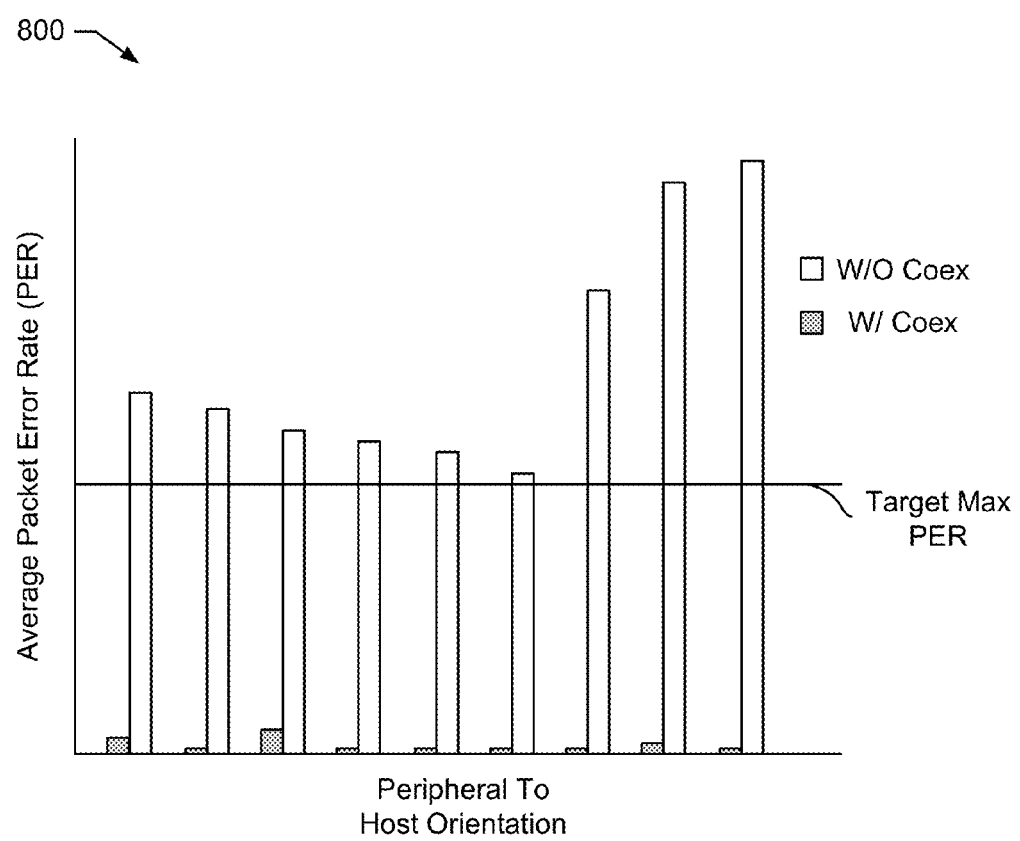
FIG. 8 illustrates a diagram of packet error rates for a wireless subsystem in different configurations in accordance with some embodiments.

FIG. 8 a diagram 800 of average packet error rates for a BT wireless subsystem 510 when a BT peripheral device, e.g., a BT mouse, is placed in different positions relative to the computing device 402 (and thus relative to the BT antenna 614 thereon). While the results illustrated in FIG. 8 present information for a particular example, similar results can occur with a variety of different BT peripheral devices, e.g., a BT keyboard or a BT touch pad, which can be positioned at different distances and orientations with respect to the BT antenna 614 of the computing device 402. Operation of the BT peripheral device can be measured with respect to a target maximum packet error rate (PER). For example, a target maximum PER for a computing device 402 connected to a BT peripheral device can be at or below 20%. A user's perception of the operation of a BT peripheral device can vary with a measured PER, where operation below a maximum PER can provide excellent to good performance, while operation above the maximum PER can provide fair to poor performance, which can be noticeable to the user of the computing device 402 and BT peripheral device. In some embodiments, a BT peripheral device can use different amounts of BT time slots to exchange information with the "host" computing device 402. In a representative embodiment, in response to a one time slot poll from the "host" computing device 402, the BT peripheral device can respond by transmitting packets to the computing device 402 that occupy one, three, or five consecutive time slots, each time slot spanning 625 microseconds. Including both directions of transmission, a poll and response between the computing device 402 and a BT peripheral device can span from 1.25 to 3.75 milliseconds. Simultaneous transmission from a nearby wireless antenna (e.g., Wi-Fi antennas 612A/B) can result in interference with reception of the BT packets via the BT antenna 614 if the isolation between the Wi-Fi antennas 612A/B and the BT antenna 614 is not adequate. Restricting the Wi-Fi wireless subsystem 510 to only send relatively short acknowledgement (ACK) packets (or more generally a set of "short" control or signaling messages) concurrent with reception by the BT wireless subsystem 510 can improve the performance of the BT wireless subsystem 510. High efficiency Wi-Fi communication protocol options, however, e.g., aggregation of media access control (MAC) protocol data units (PDUs), which can span durations of approximately 2.5 milliseconds can significantly overlap with the reception of BT packets by the BT wireless subsystem 510. In some embodiments, a distant Wi-Fi antenna, e.g., Wi-Fi antenna 612C, can be used for the transmission of a set of management and control messages, e.g., acknowledgement (ACK) or negative acknowledgement (NACK) packets, to mitigate interference into a co-located BT antenna, e.g., BT antenna 614, in a computing device 402, while the other Wi-Fi antennas 612A/B can be used for transmissions that do not overlap with concurrent BT reception by the BT antenna 614. Setting particular usage for different antennas, signal chains, times of transmission, power levels, etc. can form a portion of a coexistence policy that mitigates coexistence interference between the Wi-Fi and BT wireless subsystems 510. FIG. 8 illustrates that with proper use of a coexistence (Coex) policy, a target maximum PER for the BT wireless subsystem 510 can be achieved for some or all different orientations and positions expected for the BT peripheral device communicating with the computing device 402.

Figure 9:
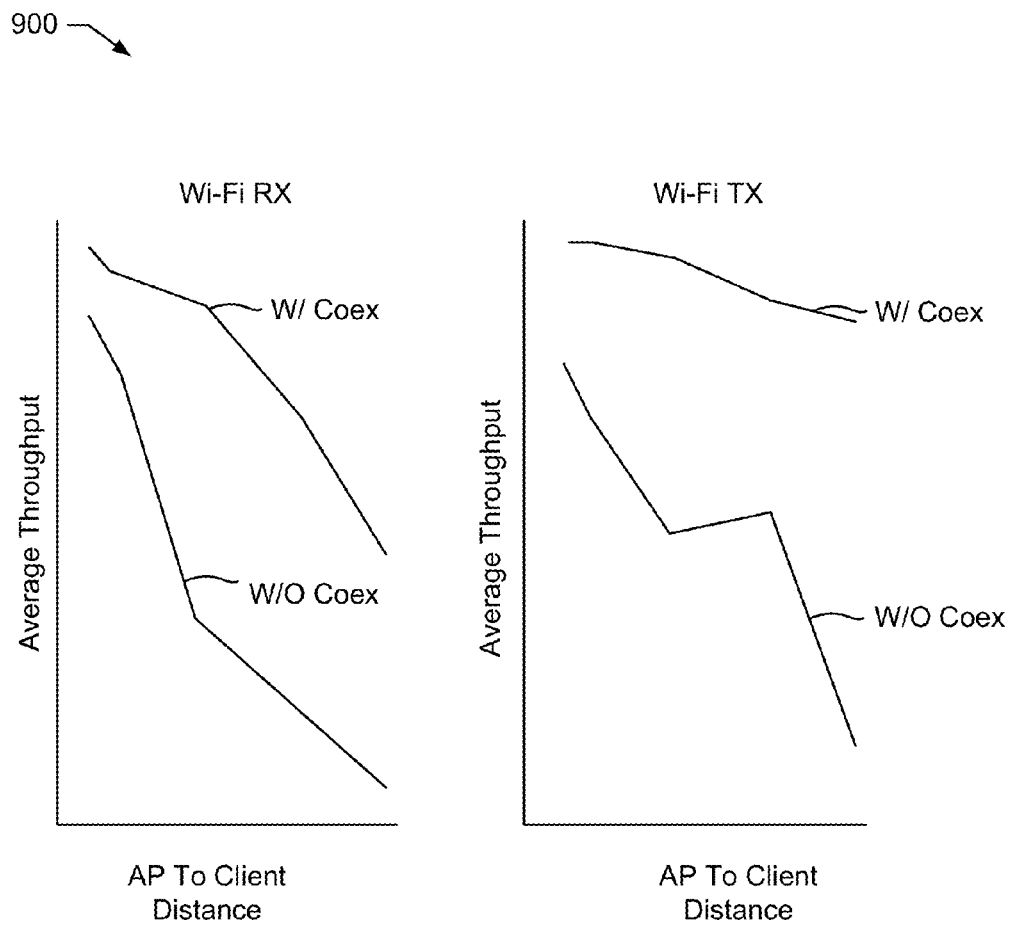
FIG. 9 illustrates diagrams of data throughput rates for a wireless subsystem in different configurations in accordance with some embodiments.

FIG. 9 illustrates a set of diagrams 900 that represent average throughput in a transmit direction and in a receive direction for a Wi-Fi wireless subsystem 510 in a computing device 402 plotted at different distances between the computing device (client) and a Wi-Fi access point (AP) 404 over a Wi-Fi wireless connection 410. (The set of diagrams 900 can also pertain to the computing device 402 acting as a Wi-Fi AP connected to a separate Wi-Fi client device.) The average throughput achievable in both a transmit direction and a receive direction can decrease as the distance between the Wi-Fi AP 404 and the computing device 402 increases. Wireless radio frequency interference can occur in either the transmit or receive directions of the Wi-Fi connection 410, particularly when using a radio frequency channel that overlaps with radio frequency interference generated by a co-located wireless subsystem 510 and/or by a high-speed wired interface, e.g., via a high-speed wired connection port 606, of which a USB 3.0 port 616 is a representative example. Without a coexistence policy to mitigate radio frequency coexistence interference between one or more high-speed wired interfaces (and/or a co-located wireless subsystem 510) and the Wi-Fi wireless subsystem 510, the computing device 402 can experience lower performance, e.g., as measured by an average throughput of the Wi-Fi wireless subsystem 510, than when using a coexistence policy, as illustrated by the diagrams 900 in FIG. 9. A coexistence policy can account for placement of components of wireless systems 510 in the computing device 402, e.g., positions of the Wi-Fi antennas 612 A/B/C relative to other antennas, e.g., BT antenna 614, and/or to high-speed wired connection ports 606, e.g., USB 3.0 ports 616. The computing device 402 can use the coexistence policy to modify transmit levels, transmit times, transmit frequencies, receive times, receive frequencies, wireless circuitry (transmit and/or receive) settings, transmit types (e.g., particular messages), transmit/receive modes (e.g., SISO vs. MIMO), etc. to mitigate coexistence interference between wireless subsystems 510 and between high-speed wired connection ports 606 and the wireless subsystems 510. In a representative embodiment, the Wi-Fi antenna 612C can be configured for transmission only (i.e., and not for reception) when radio frequency interference from one or more adjacent "nearby" USB 3.0 ports 616 can occur. In an embodiment, the Wi-Fi wireless subsystem 510 can be configured to use all three antennas 612A/B/C for reception (e.g., using spatial and/or receive diversity) when the USB 3.0 ports 616 are inactive and/or when no USB 3.0 devices are connected to the USB 3.0 ports 616, and to use only two antennas 612A/B for reception (e.g., again using spatial and/or receive diversity but with fewer antennas). In some embodiments, the third Wi-Fi antenna 612C can be used (and the remaining Wi-Fi antennas 612A/B not used) for certain transmissions to mitigate radio frequency interference between the Wi-Fi wireless subsystem 510 and the co-located BT wireless subsystem 510 operating via the BT antenna 614.

FIG. 10 illustrates a table 1000 that includes a representative set of configurations for a computing device 402 including operating states of the Wi-Fi wireless subsystem 510 in the computing device 402 and an associated configuration for the Wi-Fi wireless subsystem 510 to mitigate radio frequency interference (generated by the Wi-Fi wireless subsystem 510 and/or received by the Wi-Fi wireless subsystem 510). In an embodiment, the operating states of the Wi-Fi wireless subsystem 510 include a first state corresponding to the Wi-Fi wireless subsystem 510 being powered, the Wi-Fi wireless subsystem 510 being not associated with an access point, and the Wi-Fi wireless subsystem 510 of the computing device 402 not operating as a shared wireless access point (SWAP). In this first state, the Wi-Fi wireless subsystem 510 can be configured for MIMO operation to use multiple transmit and receive antennas, e.g., to use a diversity mode for both transmission and reception, where the number of spatial streams can depend on a configuration of one or more high-speed wired connection ports 606, e.g., USB 3.0 ports 616, which can be located near to at least one of the Wi-Fi antennas, e.g., Wi-Fi antenna 612C. In an embodiment, one or more USB 3.0 ports 616 can support communication with external devices using different USB protocols (e.g., 1.X, 2.X, 3.X, etc.), and a MIMO operating mode of the Wi-Fi wireless subsystem 510 can be selected based on detection of an operating mode and/or a current operating state and/or an operational capability of one or more external devices connected to the one or more USB 3.0 ports 616. When the high-speed wired communication port 606 is connected to a USB 3.0 device, in an embodiment, the Wi-Fi wireless subsystem 510 can be configured to operate with a maximum of two receive antennas and up to three transmit antennas. In an embodiment, the Wi-Fi wireless subsystem 510 is configured to operate in a 3 (transmit) by 2 (receive) MIMO configuration. In an embodiment, when no USB 3.0 devices are connected to the USB 3.0 ports 616 of the computing device 402, and when configured for the first operating state, the Wi-Fi wireless subsystem 510 antennas can be configured to use a 3×3 MIMO antenna configuration. While the Wi-Fi wireless subsystem 510 is not associated with an AP in the first state, the Wi-Fi wireless subsystem 510 is configured in advance to communicate in either a 3×2 or a 3×3 MIMO antenna configuration based on whether a USB 3.0 device is connected to one of the USB 3.0 ports 616.

In an embodiment, the operating states of the Wi-Fi wireless subsystem 510 include a second operating state in which the Wi-Fi wireless subsystem 510 communicates using a frequency band that does not overlap or otherwise interfere significantly with a frequency band used by a co-located BT wireless subsystem 510, e.g., Wi-Fi uses the 5 GHz frequency band, while BT uses the 2.4 GHz frequency band. When operating in the 5 GHz frequency band, the Wi-Fi wireless subsystem 510 can be configured for 3×3 MIMO operation.

In an embodiment, the operating states of the Wi-Fi wireless subsystem 510 include one or more operating states in which the Wi-Fi wireless subsystem 510 communicates using a radio frequency channel band that overlaps or otherwise interferes with a radio frequency channel band used by a co-located BT wireless subsystem 510, e.g., both the Wi-Fi and BT wireless subsystems use the 2.4 GHz frequency channel band. A configuration of the Wi-Fi wireless subsystem 510 in one of the operating states having an overlapping (and/or an interfering) radio frequency channel band can depend on a configuration of the BT wireless subsystem 510. In an embodiment, a level of utilization by the BT wireless subsystem 510, e.g., a percentage of occupied timeslots, can be used at least in part to determine a configuration of the Wi-Fi wireless subsystem 510 to mitigate coexistence interference between the Wi-Fi and BT wireless subsystems 510. Table 1000 in FIG. 10 illustrates three different states corresponding to different BT wireless subsystem 510 utilizations, (1) below a "low" utilization threshold level, e.g., <5%, (2) between "low" and "high" utilization threshold levels, e.g., 5% to 40%, and (3) above a "high" utilization threshold level, >40%. In an embodiment, irrespective of a utilization level of the BT wireless subsystem 510, the Wi-Fi wireless subsystem 510 can be configured to use a 3×2 MIMO configuration when a USB 3.0 device is connected and a 3×3 MIMO configuration otherwise. Additional configuration information for the BT wireless subsystem 510 and the Wi-Fi wireless subsystem 510 are provided in FIGS. 11A and 11B as discussed further herein.

In some embodiments, an access point with which the Wi-Fi wireless subsystem 510 is associated can communicate with the Wi-Fi wireless subsystem 510 of the computing device 402 using a 2 (transmit) by 2 (receive) MIMO configuration, while the Wi-Fi wireless subsystem 510 can operate in a 3×2 MIMO configuration, i.e., the Wi-Fi AP can assume (and/or be informed that) the computing device 402 is operating in a 2×2 MIMO configuration, while the Wi-Fi wireless subsystem 510 is actually configured to operate in a 3×2 MIMO configuration. In an embodiment, when the Wi-Fi access point with which the Wi-Fi wireless subsystem 510 of the computing device 402 is associated supports an asymmetric MIMO configuration, e.g., a 3×2 configuration, the Wi-Fi access point can operate in a 3×3 configuration, while supporting communication with the computing device 402, which operates in a 3×2 configuration, e.g., using two parallel signal chains for data and a third signal chain for signaling/management/control messages only. In some embodiments, the Wi-Fi access point is notified of changes in configurations by the computing device 402, e.g., directly through information about a specific configuration of the computing device 402 or indirectly through preferred settings such as communicated in channel status information (CSI) feedback including a maximum value for a modulation and coding scheme (MCS). The Wi-Fi access point can communicate with the computing device 402 in accordance with information received from the computing device 402 and can send/receive streams accordingly.

FIG. 11A illustrates an additional set of configurations for the Wi-Fi and BT wireless subsystems 510 of a computing device 402 to mitigate radio frequency interference between the wireless subsystems 510 and also between at least one of the wireless subsystems 510 and a set of high-speed wired connection ports 606. In a representative embodiment, the set of high-speed wired connection ports 606 include one or more USB 3.0 ports 616. Control circuitry in the computing device 402 can configure the Wi-Fi wireless subsystem 510 and the BT wireless subsystem 510 to mitigate radio frequency interference based on operating configurations of each wireless subsystem 510, categorized into several states as listed in Table 1100 of FIG. 11A. The states illustrated in Table 1100 of FIG. 11A can correspond to the same states as illustrated in Table 1000 of FIG. 10. In the first state, the Wi-Fi wireless subsystem 510 can transmit using two parallel streams when a USB 3.0 device is connected and/or when USB 3.0 communication through at least one of the USB 3.0 ports 616 occurs, and can use a default configuration (e.g., three parallel transmit streams) when no USB 3.0 device is connected or when no USB 3.0 communication occurs. As radio frequency interference from the USB 3.0 ports 616 can interfere with the transmission of Wi-Fi signals from a nearby antenna and/or with the reception of Wi-Fi signals through a nearby antenna, e.g., Wi-Fi antenna 612C, the Wi-Fi wireless subsystem 510 can be configured to only transmit data using a maximum of two parallel streams (e.g., via Wi-Fi antennas 612 A/B) to mitigate the effects of the radio frequency interference from the USB 3.0 device connections. Similarly, to minimize RF interference from the USB 3.0 ports 616 into the reception of Wi-Fi signals, the Wi-Fi wireless subsystem 510 can be configured to receive using two antennas (e.g., Wi-Fi antennas 612A/B) when USB 3.0 is connected, active, or otherwise generating potential or actual RF interference, while configuring the third antenna, e.g., Wi-Fi antenna 612C, which can be subject to RF interference from the co-located high-speed wired connection ports, e.g., USB 3.0 ports 616, to be used only transmission. In some embodiments, the third Wi-Fi antenna, e.g., Wi-Fi antenna 612C, is used only for a limited set of transmission types, e.g., for a set of control, management, signaling, ACK and/or NACK messages.

When operating in the first state, the Wi-Fi wireless subsystem 510 can further be configured to have both transmit and receive signal chains associated with less than all antennas to be powered and "On", e.g., provide power to and/or enable wireless circuitry for only two rather than three antennas, (which can form part of the wireless circuitry in the Wi-Fi wireless subsystem 510), when radio frequency interference from high-speed connection ports, e.g., when USB 3.0 devices are connected to USB 3.0 ports 616, can occur, and to have all transmit and receive signals chains powered and "On" when no RF interference from the high-speed wired connection ports is anticipated or measured to occur. When at least one USB 3.0 device is connected to one of the USB 3.0 ports 616, a receive signal chain associated with an antenna near the USB 3.0 ports, e.g., Wi-Fi antenna 612C, can be powered down, while the transmit signal chain associated with the same antenna can remain powered and "On". Thus the third antenna, e.g., Wi-Fi antenna 612C, can be used for Wi-Fi transmit only, and the remaining two antennas, e.g., Wi-Fi antennas 612 A/B, can be used for Wi-Fi transmission and reception. While in the first operating state, the Wi-Fi wireless subsystem 510 is not actively associated with an access point or configured to be a shared wireless access point, and thus the Wi-Fi wireless subsystem configuration in the first operating state can anticipate configurations that are matched for use when the Wi-Fi wireless subsystem 510 is associated (i.e., ready for future use). All three Wi-Fi transmit signal chains are powered "on" in the first operating state, and the Wi-Fi wireless subsystem 510 can transmit acknowledgements (ACKs) using any or all of the three antennas. In the first operating state, in addition, the BT wireless subsystem 510 can be configured to operate with minimal or no coexistence operational constraints (BT Coex="Off"), as radio frequency interference from the unassociated Wi-Fi wireless subsystem 510 into the BT wireless subsystem 510 can be anticipated to have minimal or no impact on BT performance. Furthermore, in the first operating state, the Wi-Fi wireless subsystem 510 can be configured with minimal or no "desense" adjustments, which can correspond to using a set of wireless circuitry configured for a relatively high level of receive gain (i.e., at a level necessary to receive Wi-Fi AP signals) with the expectation that RF interference into the Wi-Fi wireless subsystem 510 can be minimal (accounting for the proper use of two or three receive antennas as required to mitigate any high-speed wired connection port radio frequency coexistence interference into the third antenna).

The Wi-Fi wireless subsystem 510 can be configured to mitigate coexistence interference received from the operation of one or more high-speed wired connection ports 606 depending on the level of radio frequency interference and/or based on a frequency band used by the Wi-Fi wireless subsystem 510. In an embodiment, as listed in Table 1100 for the second state, when operating in a 5 GHz frequency band, which can be relatively immune to RF interference from the high-speed wired connection ports, the Wi-Fi wireless subsystem 510 can be configured to transmit a default number of spatial streams, which can include three spatial streams. A higher number of parallel spatial streams can contribute to higher throughput performance for the Wi-Fi wireless subsystem 510. When operating the Wi-Fi wireless subsystem 510 in the 5 GHz frequency band, the level of radio frequency interference between the Wi-Fi wireless subsystem 510 and the BT wireless subsystem 510, which operates in the 2.4 GHz frequency band, can be minimal, so that the Wi-Fi and BT wireless subsystems 510 can be configured for maximal performance. Thus, the BT wireless subsystem 510 can be configured with minimal or no coexistence operational constraints (BT Coex="Off"). With minimal RF interference anticipated from the co-located BT wireless subsystem 510 or from co-located high-speed wired connections, when operating in the second state, the Wi-Fi wireless subsystem 510 can be configured to use a default number of transmit streams, all wireless circuitry signal chains can be powered, and all antennas can be used for transmitting acknowledgement (ACK) messages. In addition, Wi-Fi "desense" can be configured to be "Off" resulting in optimal use of receive wireless circuitry.

For each of the additional operating states (3, 4, and 5) in Table 1100 of FIG. 11A, the Wi-Fi wireless subsystem 510 of the computing device 402 can operate in a frequency band, e.g., the 2.4 GHz frequency band, which overlaps with a frequency band used by the BT wireless subsystem 510, e.g., the same 2.4 GHz frequency band. The Wi-Fi wireless subsystem 510 can be configured to mitigate radio frequency coexistence interference by modifying its constituent transmit and receive wireless circuitry based at least in part on a utilization level of the BT wireless subsystem 510. Similarly the BT wireless subsystem 510 can be configured to mitigate the effects of radio frequency coexistence interference based on its own utilization level. The third, fourth, and firth operating states listed in Table 1100 can correspond to different levels of BT utilization, which in some embodiments can refer to a percentage of time slots (and/or bandwidth) in use (e.g., on average) by the BT wireless subsystem 510 (which can be connected to a different number of peripheral devices ranging from one up to seven in parallel). In a third operating state, in which the BT utilization level can be less than a low threshold level, e.g., less than 5%, the Wi-Fi wireless subsystem 510 can be configured to use the same settings as described for the first operating state. With a low level of utilization, the BT wireless subsystem 510 can be more immune to the effects of radio frequency interference than when operating with higher levels of utilization. In the third operating state, the BT wireless subsystem 510 and the Wi-Fi wireless subsystem 510 can be configured to operate in a "hybrid" coexistence mode to mitigate at least in part effects of radio frequency interference with each other. As the Wi-Fi and BT wireless subsystems 510 share a common or overlapping frequency band, the Wi-Fi and BT wireless subsystems 510 can interfere with each other. When radio frequency isolation between the Wi-Fi and BT wireless subsystems 510 exceeds an isolation threshold level, e.g., a pre-determined isolation threshold level, the Wi-Fi and BT wireless subsystems 510 can operate (or be assumed to operate) without interfering with each other; however, when radio frequency isolation between the Wi-Fi and BT wireless subsystems 510 is not adequate, e.g., less than the predetermined isolation threshold level, simultaneous transmission by one wireless subsystem and reception by another wireless subsystem should be avoided to minimize the effects of radio frequency interference between the wireless subsystems. In an embodiment, while in the "hybrid" coexistence mode, simultaneous transmission by both the Wi-Fi and BT wireless subsystems 510 can be allowed, simultaneous reception by both the Wi-Fi and BT wireless subsystem 510 can also be allowed, but the Wi-Fi and BT wireless subsystems 510 can avoid simultaneous transmission by one wireless subsystem and reception by the other wireless subsystem. For example, the Wi-Fi and BT wireless subsystems 510, in an embodiment, can coordinate transmission and reception times to not overlap, e.g., use a form of time division multiplexing, thereby minimizing radio frequency interference between the Wi-Fi and BT wireless subsystems 510. The "hybrid" coexistence mode can be used for any of the third, fourth, and fifth operating states, when the two wireless subsystems share and/or overlap frequency bands and when frequency isolation between the wireless subsystems is not adequate. In the third operating state, the BT wireless subsystem's utilization can be low enough such that coexistence interference from the Wi-Fi wireless subsystem 510 into the BT wireless subsystem can be minimal. Similarly, with low utilization, radio frequency interference from the BT wireless subsystem 510 into the Wi-Fi wireless subsystem 510 can be minimal, so that the Wi-Fi "desense" level can be set to an "OFF" mode. When in the third operating state, the Wi-Fi wireless subsystem 510, and in particular antennas adjacent to high-speed wired connection ports 606, however, can be vulnerable to radio frequency interference, and thus, the Wi-Fi wireless subsystem 510 can be configured in the third operating state to only use a subset (and not all) of the antennas for reception (e.g., use only those antennas less vulnerable to radio frequency interference by being at a greater distance and therefore have greater isolation from the high-speed wired connection ports 606) when RF interference from the high-speed wired connection ports 606 is anticipated, known, or measured. In an embodiment, when USB 3.0 devices are connected to one or more USB 3.0 connection ports 616, the Wi-Fi wireless subsystem 510 can use one or more nearby antennas, e.g., Wi-Fi antenna 612C, for transmissions only and not for reception of Wi-Fi signals to mitigate coexistence interference.

When operating in the fourth operating state, in which the BT wireless subsystem's utilization is moderate, i.e., between a low utilization threshold level and a high utilization threshold level, the Wi-Fi wireless subsystem 510 can be configured to reduce radio frequency interference into the BT wireless subsystem 510, e.g., by limiting Wi-Fi transmissions for a set of management, control, signaling, and/or ACK/NACK commands to use only a single antenna (e.g., the Wi-Fi antenna with the highest level of isolation from the BT antenna can be used for Wi-Fi ACK/NACK messages). The BT wireless subsystem 510 can become increasingly vulnerable to radio frequency interference as the BT utilization level increases. Increased BT utilization can also contribute to increased radio frequency interference into the Wi-Fi wireless subsystem 510, and thus, in the fourth operating state, the Wi-Fi wireless subsystem 510 can be configured to turn Wi-Fi Desense "On" when the BT wireless subsystem 510 is connected to any BT peripheral devices with a synchronous connection-oriented (SCO) link or that use an advanced audio distribution profile (A2DP). With Wi-Fi Desense "On", the Wi-Fi wireless subsystem 510 can modify operation of its wireless circuitry, e.g., receive signal chains, to mitigate levels of radio frequency interference due to BT connections. In some embodiments, Wi-Fi Desense is turned "Off" when a received signal strength indication (RSSI) for received Wi-Fi signals falls below a low RSSI threshold level, e.g, below an RSSI of –70 dBm. Lower levels of Wi-Fi RSSI can correspond to weak received Wi-Fi signals, which can in turn require higher levels of amplification in the Wi-Fi receive signal chains. In some embodiments, Wi-Fi Desense is turned "On" when the Wi-Fi RSSI exceeds a high RSSI threshold level, e.g., above an RSSI of –65 dBm. Separate low and high RSSI threshold levels can provide a form of hysteresis, and the difference between the high and low RSSI threshold levels can be selected to minimize switching the Desense between "Off" and "On" settings too frequently due to random fluctuations in measured Wi-Fi RSSI levels. The remainder of the settings used in the fourth operating state can be the same as or similar to those used for the third operating state.

When operating in a fifth operating state, in which the BT wireless subsystem's utilization is high, i.e., above a high utilization threshold level, the Wi-Fi wireless subsystem 510 can be further configured to enable a Wi-Fi Desense "On" mode of operation to mitigate the effects of radio frequency interference from the high utilized BT wireless subsystem into the Wi-Fi wireless subsystem. In an embodiment, enabling the Wi-Fi Desense "On" mode of operation can be conditioned on a measured Wi-Fi RSSI level exceeding a high RSSI threshold level, e.g., as described above for the fourth operating state. Similarly, disabling the Wi-Fi Desense to an "Off" mode of operation can be conditioned on the measured Wi-Fi RSSI level falling below a low RSSI threshold level. The remainder of the settings for the BT wireless subsystem and the Wi-Fi wireless subsystem 510 can be substantially the same in the fifth operating state as in the fourth operating state.

In addition to the settings listed in Table 1100 of FIG. 11A, the settings summarized in Table 1150 of FIG. 11B can also be used to mitigate radio frequency coexistence interference between co-located wireless subsystems 510 of a computing device 402, and between radio frequency energy emitted by high-speed wired connection ports 606 and wireless subsystems 510 of the computing device 402. Wireless circuitry of the BT wireless subsystem 510 can be configured to mitigate coexistence interference when the Wi-Fi wireless subsystem 510 operates in a shared or overlapping frequency band, e.g., the 2.4 GHz band (as described for States 3, 4, or 5 previously), and also when one or more BT wireless peripheral devices are connected to the BT wireless subsystem 510. In some embodiments, the BT wireless subsystem 510 can enable a Desense setting to combat radio frequency interference whenever a co-located wireless subsystem, e.g., the Wi-Fi wireless subsystem 510, operates in the same frequency band as the BT wireless subsystem 510. In an embodiment, when the BT wireless subsystem 510 is connected to at least one BT wireless peripheral device 406, and when the Wi-Fi wireless subsystem 510 operates in a frequency band shared or overlapping with the BT wireless subsystem 510, the BT wireless subsystem 510 can be configured to use a "fixed" adaptive frequency hopping (AFH) map, e.g., a pre-configured AFH map that avoids select frequency channels in which coexistence interference from co-located Wi-Fi wireless subsystems 510 can be anticipated or a determined AFH map that "maps out" particular frequency channels in which coexistence interference from co-located Wi-Fi wireless subsystems 510 is measured. In an embodiment, the BT wireless subsystem 510 selects an AFH map to use based on configuration information provided from the Wi-Fi wireless subsystem (directly or indirectly via a host processor 502). In some embodiments, the computing device 402 includes one or more stored (or retrievable from external storage) AFH maps and selects a fixed AFH map for the BT wireless subsystem 510 based at least in part on a configuration of the Wi-Fi wireless subsystem 510 and a connection state of the BT wireless subsystem 510. In some embodiments, when the BT and Wi-Fi wireless subsystems 510 operate in a shared or overlapping frequency band, the BT wireless subsystem 510 can be configured to reduce a transmit power level to mitigate interference, e.g., to use a transmit power level at or below 0 dBm, or to transmit at a level at least 10 dB below a default transmit power level.

When operating in any of the states 1 through 5 listed in Table 1100 of FIG. 11A and as summarized in Table 1150 of FIG. 11B, a processor (or other control circuitry as described herein) can adjust wireless circuitry of the computing device 402 to mitigate coexistence interference by applying any combination of the following configuration settings. The processor can adjust wireless circuitry in the computing device 402 by setting a coexistence (Coex) mode for the BT wireless subsystem 510, e.g., using an "OFF" or "Hybrid" BT Coex setting as described previously. The processor can adjust wireless circuitry in the computing device 402 by setting a Desense mode for the Wi-Fi wireless subsystem 510, e.g., using an "ON" or "OFF" Wi-Fi Desense setting conditionally as described previously. The processor can adjust wireless circuitry in the computing device 402 by setting a Desense level for the Wi-Fi wireless subsystem 510, e.g., using one of multiple levels that correspond to different receive signal chain gain settings (or other settings that can influence signal processing of received Wi-Fi signals) to combat levels of coexistence interference from a co-located BT wireless subsystem 510. The processor can adjust wireless circuitry in the computing device 402 by setting Wi-Fi Transmit power offset levels and/or apply Wi-Fi Transmit power settings for each of multiple transmit signal chains associated with respective antennas. The processor can also adjust wireless circuitry in the computing device 402 by applying Wi-Fi Acknowledgement (ACK) settings, e.g., by determining how many and/or which transmit signal chains and associated antennas are used for Acknowledgement messages (or more generally used for a set of signaling and/or control messages that are communicated by the Wi-Fi wireless subsystem 510 to a Wi-Fi AP). The processor can also adjust wireless circuitry in the computing device 402 by issuing re-association commands to a Wi-Fi AP when changing between configurations that use different numbers of Wi-Fi transmit streams, as described further herein.

The Wi-Fi wireless subsystem 510, in some embodiments, can operate in a SISO mode when connected to a Wi-Fi AP configured for operation in accordance with a Wi-Fi communication protocol that does not support MIMO, e.g., an 802.11b or an 802.11g wireless communication protocol. The Wi-Fi wireless subsystem 510, when associated with a Wi-Fi AP configured for operation in accordance with a Wi-Fi communication protocol that does support MIMO, e.g., an 802.11a or an 802.11n or an 802.11ac wireless communication protocol, can be configured for symmetric or asymmetric MIMO operation, e.g., 3×3 or 3×2. In some embodiments, the Wi-Fi wireless subsystem 510 re-associates with the Wi-Fi AP in response to a change in configuration of the Wi-Fi wireless subsystem 510 between different MIMO configurations, e.g., between a symmetric 3×3 and an asymmetric 3×2 operation. As described hereinabove, the Wi-Fi wireless subsystem 510 can operate in an asymmetric 3×2 configuration that includes three spatial streams in the transmit direction to the AP and two spatial streams in the receive direction from the AP when the AP supports an asymmetric MIMO configuration (and when radio frequency interference conditions at the computing device 402 permit the use of three parallel spatial streams). The Wi-Fi wireless subsystem 510 can also operate in an asymmetric 3×2 configuration that includes only two spatial streams in the transmit direction (for data) to the AP and can transmit select control, management, or signaling messages using one, two or three antennas (e.g., sending ACK/NACK messages to the AP using all three antennas in parallel as indicated for the first, second, and third operating states in Table 1100 of FIG. 11, or using only one antenna as indicated for the fourth and fifth operating states in Table 1100 of FIG. 11), and two spatial streams in the receive direction (for data) from the AP. In some embodiments, the AP can assume that the Wi-Fi wireless subsystem 510 of the computing device 402 is operating in a 2×2 configuration, while the Wi-Fi wireless subsystem 510 actually communicates using a "modified" 3×2 configuration as described herein. When operating in a 3×3 configuration, the Wi-Fi wireless subsystem 510 can be configured to use a broader set of modulation and coding schemes than when configured to operate in a 2×2 configuration, as 3×3 can support higher data rates than 2×2. The Wi-Fi wireless subsystem 510 can re-associate with the AP when changing between a 3×3 and a 3×2 configuration in order to renegotiate a downlink modulation and coding scheme that is properly supported by the configuration in use.

When configured to operate in any of the operating states listed in Table 1100 of FIG. 11A, the computing device can control settings for the Wi-Fi and BT wireless subsystems 510 by setting one or more of the following: a BT wireless subsystem coexistence mode, a Wi-Fi wireless subsystem desense mode (e.g., on or off), a Wi-Fi wireless subsystem desense level (where different desense levels can correspond to different configurations for wireless circuitry, including receive signal chains), a BT transmit power level, one or more Wi-Fi transmit power levels, including an option for different power levels for different transmit signal chains associated with different antennas, and a Wi-Fi configuration for a number of transmit antennas used for a set of management, control, or signaling messages (e.g., including ACK/NACK messages). As described herein, the computing device 402 can include control circuitry that can configure a set of wireless subsystems contained in the computing device 402 to operate in one of a set of multiple operating modes, each operating mode corresponding to a set of configurations to mitigate radio frequency coexistence interference between at least two of the wireless subsystems and between at least one of the wireless subsystems and at least one high-speed wired connection ports. The configurations can include settings that control use of the wireless circuitry to provide for transmit only, receive only, transmit and receive operation, and transmit of select control messages only, for one or more antennas and associated signal chains. In some embodiments, each wireless signal chain can be configured to a "transmit" mode, a "receive" mode, or a "control" mode of operation to mitigate coexistence interference. In some embodiments, wireless circuitry is configured to mitigate coexistence interference from one or more of USB 3.0 ports, Thunderbolt ports, HDMI ports, and Ethernet ports into one or more wireless subsystems 510 of the computing device 402.

Figure 12:
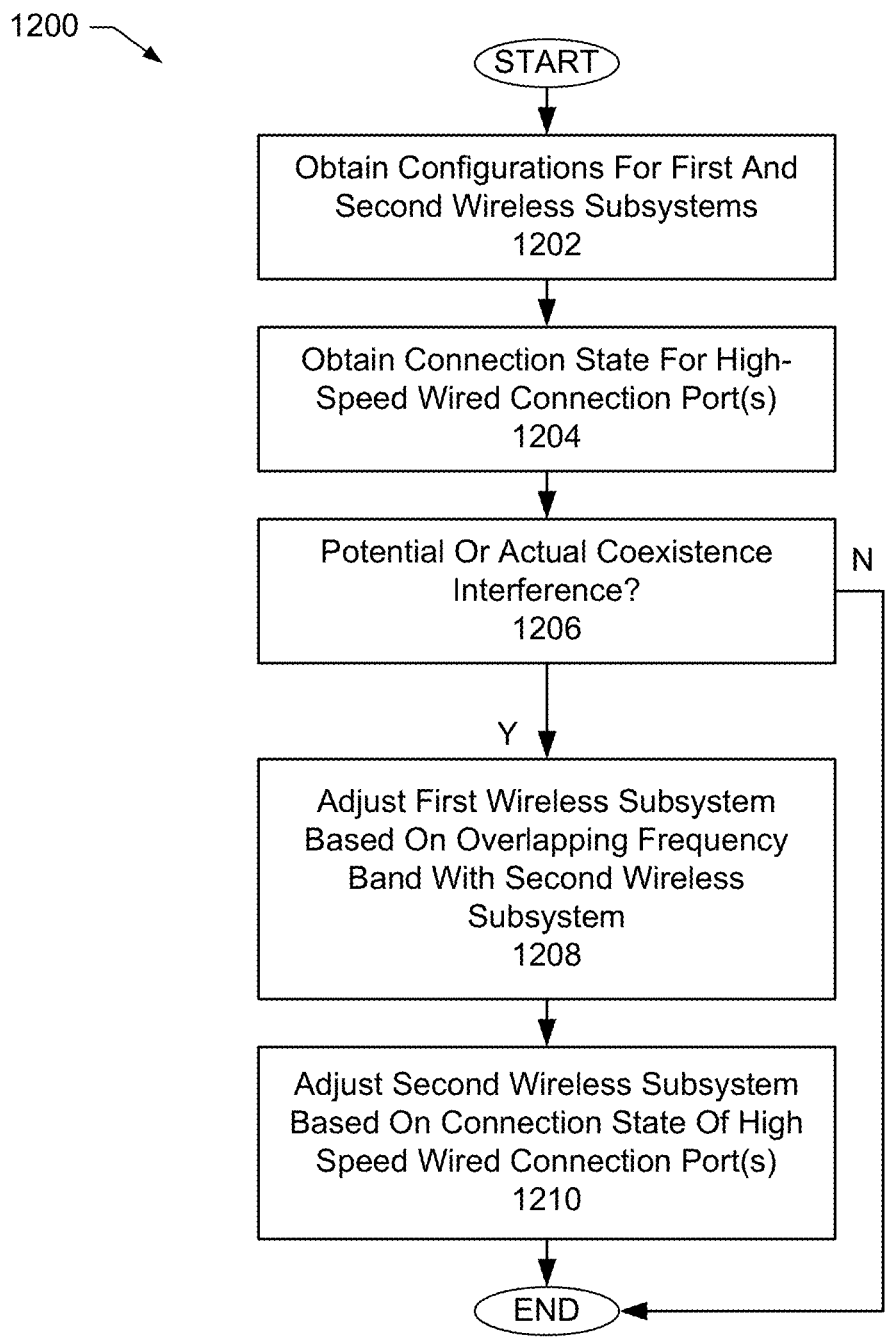
FIG. 12 illustrates a representative method that can be performed by components of a computing device to mitigate coexistence interference between multiple wireless and wired subsystems of the computing device in accordance with some embodiments.

FIG. 12 illustrates a flowchart 1200 for a representative method that can be performed by components of a computing device 402 to mitigate coexistence interference between multiple wireless subsystems 510 and wired connection ports of the computing device 402 in accordance with some embodiments. In a first step 1202, a processor, e.g., host processor 302, host processor 502, or another processor included in or coupled to the wireless subsystems 510, obtains configurations for the first wireless subsystem and the second wireless subsystem. In some embodiments a configuration for a wireless subsystem can include one or more of: a frequency band, a transmit power level, a transmit and/or receive utilization factor, a time/frequency/spatial/code division multiplexing, a modulation and coding scheme (MCS) setting, a receive signal chain setting (e.g., gain control), and a connection state with an external system (e.g., an access point, a client device, a peripheral device). In a second step 1204, the processor obtains a connection state of at least one high-speed wired connection port in the computing device 402. In some embodiments, the connection state includes whether a device is connected, whether the device supports one or more of a set of communication protocols, whether the device is active, or a combination of these. In a representative embodiment, the connection state includes an indication of whether an external device connected to at least one of the high-speed wired connection ports operates in accordance with a universal serial bus (USB) 3.0 protocol. In some embodiments, the external device supports different wired protocols including at least one wired communication protocol that can emit radio frequency interference that overlaps with an operating frequency band of one of the wireless subsystems. In a third step 1206, the processor determines whether potential or actual coexistence interference exists at the computing device 402, e.g., based on the configurations of the wireless subsystems and the connection state of the high-speed wired connection port. Coexistence interference can occur for many different reasons as described hereinabove and can include but not be limited to shared or overlapping frequency bands and shared or overlapping transmission time periods of one wireless subsystem with reception time period of another wireless subsystem. In a third step 1206, the processor determines whether potential or actual coexistence interference exists at the computing device 402, e.g., based on the configurations of the wireless subsystems and the connection state of the high-speed wired connection port. Coexistence interference can occur for many different reasons as described hereinabove and can include but not be limited to shared or overlapping frequency bands and shared or overlapping transmission time periods of one wireless subsystem with reception time period of another wireless subsystem. When actual or potential coexistence interference exists at the computing device as determined by the processor, the method can continue to step 1208, in which the processor adjusts wireless circuitry in the first wireless subsystem based at least in part on whether the first and second wireless subsystems share a common or overlapping frequency band. Adjusting wireless circuitry by the processor in the computing device 402 can include one or more actions taken by the processor and/or by associated wireless controllers or other control circuitry as described hereinabove to mitigate interference between wireless subsystems and/or between wireless subsystems and wired connection ports. In an embodiment, the first wireless subsystem can use a first frequency band, while the second wireless subsystem can be configured to share or overlap with the first frequency band in some configurations and to not share or overlap with the first frequency band in other configurations. In a representative embodiment, the first wireless subsystem operates in accordance with a wireless personal area network (WPAN) protocol, e.g. a Bluetooth protocol, that uses a 2.4 GHz frequency band, while the second wireless subsystem operates in accordance with a wireless local area network (WLAN) protocol, e.g., an 802.11 Wi-Fi protocol, that uses either a 2.4 GHz frequency band or a 5.0 GHz frequency band. In step 1210, the processor is configured to adjust wireless circuitry of the second wireless subsystem based on the connection state of the at least one high-speed wired connection port.

Adjusting wireless circuitry by the processor in the computing device 402 can include one or more actions taken by the processor and/or by associated wireless controllers or other control circuitry as described hereinabove to mitigate coexistence interference between wireless subsystems and/or between wireless subsystems and wired connection ports. In an embodiment, the first wireless subsystem can use a first frequency band, while the second wireless subsystem can be configured to share or overlap with the first frequency band in some configurations and to not share or overlap with the first frequency band in other configurations. In a representative embodiment, the first wireless subsystem operates in accordance with a wireless personal area network (WPAN) protocol, e.g. a Bluetooth protocol, that uses a 2.4 GHz frequency band, while the second wireless subsystem operates in accordance with a wireless local area network (WLAN) protocol, e.g., an 802.11 Wi-Fi protocol, that uses either a 2.4 GHz frequency band or a 5.0 GHz frequency band. In step 1210, the processor is configured to adjust wireless circuitry of the second wireless subsystem based on the connection state of the at least one high-speed wired connection port. Adjusting wireless circuitry of the second wireless subsystem (e.g., an 802.11 Wi-Fi subsystem) to use an asymmetric MIMO mode can include restricting use of at least one antenna and associated signal chains of the second wireless subsystem to a transmit only mode. In a representative embodiment, the computing device 402 includes multiple antennas and associated signal chains that can be used by the second wireless subsystem, and an asymmetric MIMO mode can include using a different number of antennas in the transmit uplink direction (to the AP) than in the receive downlink direction (from the AP). In an embodiment, at least one of the antennas can be vulnerable to coexistence interference from radio frequency energy radiated by an active high-speed wired connection port connected to an external device. The vulnerable antenna(s) can be configured to transmit and not receive to minimize the effects of radio frequency interference received from the co-located wired connection port in the computing device 402 (e.g., when configured to operate in a mode that can interfere with the reception of RF signals from the AP.) In an embodiment, the second wireless subsystem can be configured to operate using at least two spatial streams in each direction, with an additional third antenna used for a transmit only mode, e.g., to send a restricted set of control messages, such as acknowledgement (ACK) messages. In an embodiment, the computing device 402, via the second wireless subsystem, can re-associate with the AP whenever switching between an asymmetric MIMO mode and a symmetric MIMO mode. In some embodiments, the AP supports use of an asymmetric MIMO mode. In some embodiments, the AP supports only symmetric MIMO modes, while the computing device 402 still configures the second wireless subsystem to use an asymmetric MIMO mode (and the associated AP can assume that the second wireless subsystem is using a symmetric MIMO mode). In an embodiment, the second wireless subsystem is configured for a 3×2 mode, while the associated AP assumes that the second wireless subsystem is configured for a 2×2 mode.

In some embodiments, the processor is configured to adjust wireless circuitry of the second wireless subsystem by restricting use of at least one antenna and associated signal chains coupled to the at least one antenna of the second wireless subsystem to use a transmit mode only. In a representative embodiment, as indicated in Table 1100 of FIG. 11A, one antenna and associated signal chains for the one antenna of an 802.11 Wi-Fi wireless subsystem are configured to operate in a transmit mode when a USB 3.0 device is connected to a high-speed connection port of the computing device 402. In some embodiments, the restriction to use a transmit only mode also depends on the USB 3.0 device being active and/or configured to operate in accordance with a USB 3.0 communication protocol. In some embodiments, additional antennas and associated signal chains of the second wireless subsystem, e.g., the 802.11 Wi-Fi wireless subsystem, are configured to operate in both transmit and receive modes. In an embodiment, the first wireless subsystem operates in accordance with a Bluetooth protocol, and when the first and second wireless subsystems share a common or overlapping frequency band, e.g., the 2.4 GHz frequency band, the wireless circuitry of the first and second wireless subsystems can be configured so that the first wireless subsystem is restricted to transmitting when the second wireless subsystem is not receiving (e.g., to mitigate radio frequency interference into the second wireless subsystem) and to receiving when the first wireless subsystem is not transmitting (e.g., to mitigate radio frequency interference into the first wireless subsystem). In some embodiments, the processor is configured to adjust the wireless circuitry of the second wireless subsystem, e.g., which can operate in accordance with an 802.11 Wi-Fi wireless protocol, when the first and second wireless subsystems share a common or overlapping frequency band, e.g., the 2.4 GHz frequency band, based at least in part on a utilization level of the first wireless subsystem. In an embodiment, the first wireless subsystem operates in accordance with a Bluetooth protocol, and the utilization level of the first wireless subsystem corresponds to a percentage of time slots (or other measure of time usage) that are configured for transmitting and/or receiving. For example, the utilization level can refer to a number of time slots assigned for transmit or receive by the first wireless subsystem with one or more peripheral devices connected thereto. In an embodiment, the utilization level is characterized into low, medium, and high utilization level categories based on comparing the utilization level to a low threshold level value and to a high threshold level value. When operating exceeds the low threshold value, e.g., less than 5% utilization of time slots, the second wireless subsystem, (which can operate in accordance with an 802.11 WLAN protocol that supports MIMO communication), can be configured to use one antenna to transmit a set of control, management, or signaling messages, e.g., ACK and/or NACK messages. In an embodiment, the antenna used for transmitting is selected from a plurality of antennas and corresponds to the antenna having the highest level of radio frequency isolation from one or more antennas used by the first wireless subsystem. With a higher utilization level, the first wireless subsystem can be more vulnerable to radio frequency interference from the second wireless subsystem when their frequency bands overlap. In an embodiment, the processor adjusts wireless circuitry of the second wireless subsystem, which can support MIMO communication with an associated access point and/or client devices, to use an asymmetric MIMO configuration (e.g., 3 transmit and 2 receive) when a device is connected to one of the high-speed connection ports and is active, e.g., a USB 3.0 device. The second wireless subsystem can be vulnerable to radio frequency interference emitted by the device connected to the high-speed connection port and can mitigate interference, at least in part, by reducing parallel reception and/or transmission to use an asymmetric rather than a symmetric mode of operation. In some embodiments, when the first wireless subsystem is connected to a peripheral device that can result in a high utilization level, e.g., operating in accordance with a Bluetooth A2DP profile or via an SCO link, the configuration of the second wireless subsystem can be adjusted to mitigate reception of interference from the first wireless subsystem. In some embodiments, the processor is configured to obtain configuration information for the first and second wireless subsystems from a table stored in memory based on operating states of the first and second wireless subsystems, and the table can include multiple operating states, e.g., one or more operating states as listed in Table 1100 of FIG. 11. In an embodiment, the table includes a first state in which the second wireless subsystem is powered and not associated with an external access point, a second state in which the first and second wireless subsystems do not operate in a shared or overlapping frequency band, and a third operating state in which the first and second wireless subsystems operate in a shared or overlapping frequency band. In some embodiments, additional operating states can include a utilization level for the first wireless subsystem.

Figure 13:
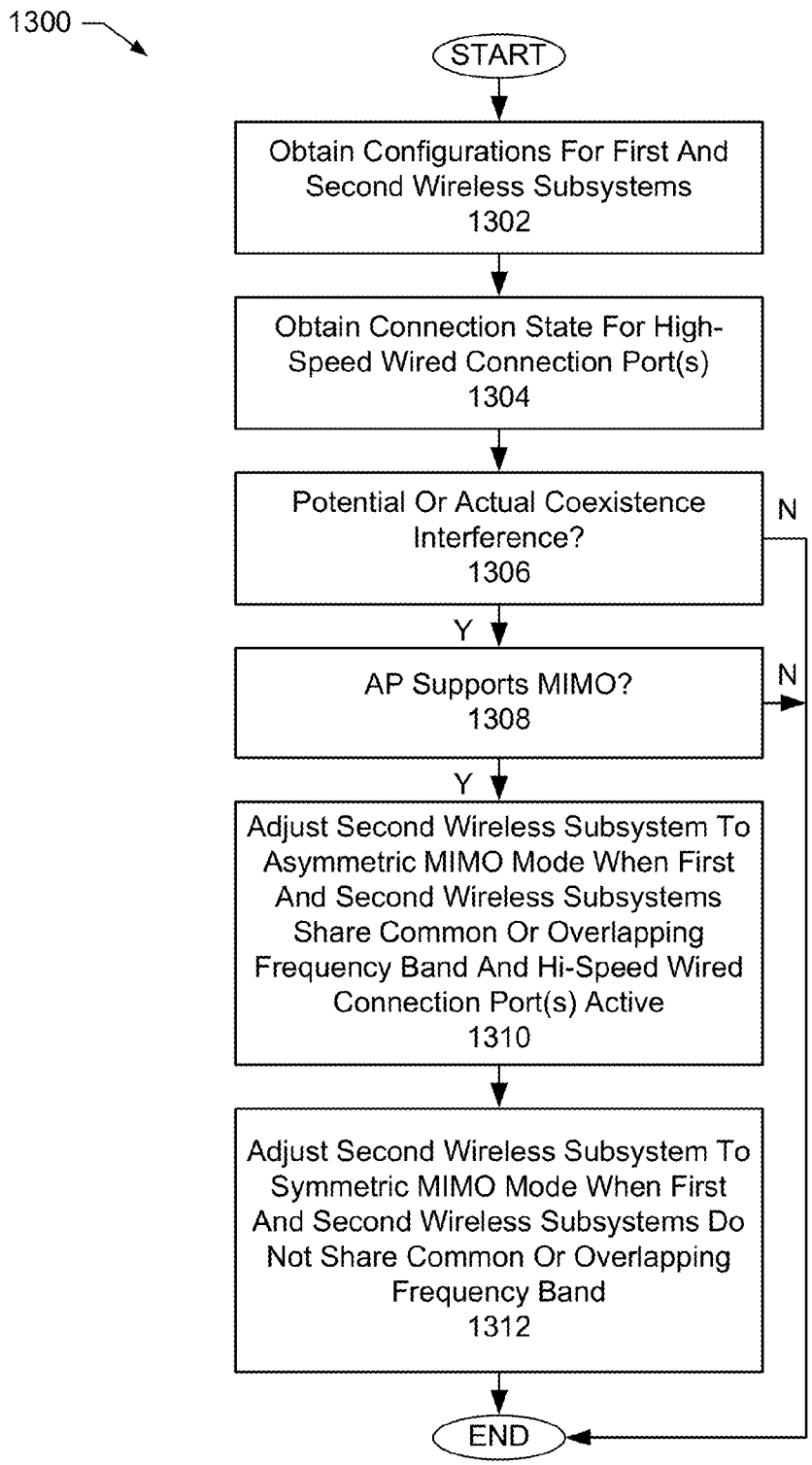
FIG. 13 illustrates another representative method that can be performed by components of a computing device to mitigate coexistence interference between multiple wireless and wired subsystems of the computing device in accordance with some embodiments.

FIG. 13 illustrates a flowchart 1300 for another representative method that can be performed by components of a computing device 402 to mitigate interference between multiple wireless subsystems 510 and wired connection ports of the computing device 402 in accordance with some embodiments. In a first step 1302, a processor, e.g., host processor 302, host processor 502, or another processor included in or coupled to the wireless subsystems, obtains configurations for the first wireless subsystem and the second wireless subsystem. In some embodiments a configuration for a wireless subsystem can include one or more of: a frequency band, a transmit power level, a transmit and/or receive utilization factor, a time/frequency/spatial/code division multiplexing, a modulation and coding scheme (MCS) setting, a receive signal chain setting (e.g., gain control), and a connection state with an external system (e.g., an access point, a client device, a peripheral device). In a second step 1304, the processor obtains a connection state of at least one high-speed wired connection port in the computing device 402. In some embodiments, the connection state includes whether a device is connected, whether the device supports one or more of a set of communication protocols, whether the device is active, or a combination of these. In a representative embodiment, the connection state includes an indication of whether an external device connected to at least one of the high-speed wired connection ports operates in accordance with a universal serial bus (USB) 3.0 protocol. In some embodiments, the external device supports different wired protocols including at least one wired communication protocol that can emit radio frequency interference with an operating frequency band of one of the wireless subsystems. When actual or potential coexistence interference exists at the computing device as determined by the processor and when an access point (AP) to which the computing device 402 is associated via the second wireless subsystem supports MIMO operation, e.g., as determined step 1308, the method can continue to step 1310, in which the processor adjusts wireless circuitry in the second wireless subsystem to use an asymmetric MIMO mode when the first and second wireless subsystems share a common or overlapping frequency band and the high-speed wired connection port is connected to an external device and active. In step 1312, the processor adjusts wireless circuitry to use a symmetric MIMO mode when the first and second wireless subsystems do not share a common or overlapping frequency band.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a non-transitory computer readable medium for controlling a computing device. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A computing device comprising:
 a processor;
 a first wireless subsystem communicatively coupled to the processor;
 a second wireless subsystem communicatively coupled to the processor; and
 at least one high-speed wired connection port communicatively coupled to the processor;
 wherein the processor is configured to:
  obtain a first wireless subsystem configuration and a second wireless subsystem configuration for the first wireless subsystem and the second wireless subsystem respectively;
  obtain a connection state of the at least one high-speed wired connection port;
  when the first wireless subsystem configuration, the second wireless subsystem configuration, or the connection state indicate potential or actual coexistence interference at the computing device:
   adjust wireless circuitry of the first wireless subsystem based at least in part on whether the first wireless subsystem and the second wireless subsystem share a common or overlapping frequency band;
   adjust wireless circuitry of the second wireless subsystem based at least in part on the connection state of the at least one high-speed wired connection port; and
   when the first wireless subsystem and the second wireless subsystem share a common or overlapping frequency band, and a utilization level of the first wireless subsystem exceeds a low utilization threshold level:
    further adjust the wireless circuitry of the second wireless subsystem to transmit a set of one or more control, signaling, and/or management messages via a single antenna, wherein the single antenna is selected, from a plurality of antennas available for use by the second wireless subsystem, to have a highest level of radio frequency isolation with respect to one or more antennas used by the first wireless subsystem.

2. The computing device of claim 1, wherein
 the first wireless subsystem operates in accordance with a wireless personal area network protocol; and
 the second wireless subsystem operates in accordance with a wireless local area network protocol.

3. The computing device of claim 1, wherein the connection state of the at least one high-speed wired connection port includes whether the at least one high-speed wired connection port is connected to an external device and is configured to operate in accordance with a universal serial bus (USB) 3.0 protocol.

4. The computing device of claim 3, wherein:
 when the at least one high-speed wired connection port is connected to the external device and is configured to operate in accordance with the USB 3.0 protocol, the processor is configured to adjust wireless circuitry of the second wireless subsystem by restricting use of at least one antenna and associated signal chains of the second wireless subsystem to a transmit only mode.

5. The computing device of claim 2, wherein:
 the wireless personal area network protocol is a Bluetooth protocol; and
 when the first wireless subsystem and the second wireless subsystem share a common or overlapping frequency band, the processor is configured to adjust the wireless circuitry of the first wireless subsystem by restricting the first wireless subsystem to transmit during time periods when the second wireless subsystem is not receiving and to receive during time periods when the second wireless subsystem is not transmitting.

6. The computing device of claim 2, wherein:
the wireless local area network protocol is an 802.11 Wi-Fi protocol;
the wireless personal area network protocol is a Bluetooth protocol; and
the utilization level of the first wireless subsystem corresponds to a percentage of time slots occupied for transmission or reception.

7. A method to facilitate coexistence of a first wireless subsystem, a second wireless subsystem, and a set of wired connection ports in a computing device that includes a processor, the method comprising:
at the processor:
when a first wireless subsystem configuration, a second wireless subsystem configuration, or a connection state of the set of wired connection ports indicate potential or actual coexistence interference at the computing device:
adjusting wireless circuitry of the first wireless subsystem based on whether the first wireless subsystem and the second wireless subsystem share a common or overlapping frequency band;
adjusting wireless circuitry of the second wireless subsystem based at least in part on the connection state of the set of wired connection ports; and
when the first wireless subsystem and the second wireless subsystem share a common or overlapping frequency band, and a utilization level of the first wireless subsystem exceeds a low utilization threshold level:
further adjusting the wireless circuitry of the second wireless subsystem to transmit a set of one or more control, signaling, and/or management messages via a single antenna, wherein the single antenna is selected, from a plurality of antennas available for use by the second wireless subsystem, to have a highest level of radio frequency isolation with respect to one or more antennas used by the first wireless subsystem.

8. The method of claim 7, wherein
the first wireless subsystem operates in accordance with a Bluetooth protocol; and
the second wireless subsystem operates in accordance with an 802.11 Wi-Fi protocol; and
the connection state of the set of wired connection ports includes whether an external device is connected thereto and is configured to operate in accordance with a universal serial bus (USB) 3.0 protocol.

9. The method of claim 8, further comprising:
when the external device is connected thereto and is configured to operate in accordance with the USB 3.0 protocol, adjusting the wireless circuitry of the second wireless subsystem by restricting use of at least one antenna and associated signal chains of the second wireless subsystem to use a transmit only mode.

10. The method of claim 8, further comprising:
when the first wireless subsystem and the second wireless subsystem share a common or overlapping frequency band, and the first wireless subsystem is connected to at least one peripheral device using an advanced audio distribution profile (A2DP) or via a synchronous connection-oriented (SCO) link, and a utilization level of the first wireless subsystem exceeds a low utilization threshold level:
adjusting configuration of one or more receive signal chains of the wireless circuitry of the second wireless subsystem to mitigate received levels of radio frequency interference from the first wireless subsystem.

11. The method of claim 8, wherein the one or more control, signaling, and/or management messages transmitted via the single antenna comprise acknowledgement (ACK) message transmissions.

12. The method of claim 11, further comprising:
when the first and second wireless subsystems share the common or overlapping frequency band, and the utilization level of the first wireless subsystem does not exceed the low utilization threshold level:
further adjusting the wireless circuitry of the second wireless subsystem to allow acknowledgement (ACK) message transmission via multiple antennas and associated signal chains.

13. The method of claim 8, further comprising:
when the first wireless subsystem and the second wireless subsystem share a common or overlapping frequency band, restricting the first wireless subsystem to transmit during time periods when the second wireless subsystem is not receiving and to receive during time periods when the second wireless subsystem is not transmitting.

14. The method of claim 8, further comprising:
when the first wireless subsystem and the second wireless subsystem share a common or overlapping frequency band, and an access point associated with the second wireless subsystem supports multiple-input multiple-output (MIMO) communication:
adjusting the wireless circuitry of the second wireless subsystem to use no more than two parallel transmit streams through two separate antennas, when an external device connected to one of the set of wired connection ports is configured to operate in accordance with a universal serial bus (USB) 3.0 protocol, and to use up to three or more parallel transmit streams otherwise.

15. The method of claim 8, further comprising:
re-associating the second wireless subsystem with an associated access point in response to adjusting the wireless circuitry of the second wireless subsystem based on a change in the connection state of the set of wired connection ports.

16. The method of claim 8, wherein the processor adjusts wireless circuitry of the first wireless subsystem and the second wireless subsystem by configuring each wireless signal chain in the computing device to a transmit mode, a receive mode, or a control mode of operation to mitigate coexistence interference between the first wireless subsystem and the second wireless subsystem.

17. A method to facilitate coexistence of a first wireless subsystem, a second wireless subsystem, and at least one high-speed wired connection port in a computing device that includes a processor, the method comprising:
at the processor:
obtain a first wireless subsystem configuration and a second wireless subsystem configuration for the first wireless subsystem and the second wireless subsystem respectively;
obtain a connection state of the at least one high-speed wired connection port;
when the first wireless subsystem configuration, the second wireless subsystem configuration, or the connection state of the at least one high-speed wired connection port indicates potential or actual coexistence interference at the computing device, and when an access point associated with the computing device supports multiple-input multiple-output (MIMO) operation:
adjust wireless circuitry of the second wireless subsystem to use an asymmetric MIMO mode when the first wireless subsystem and the second wireless subsystem share a common or overlapping frequency band and the connection state of the at least one high-speed wired connection port indicates at least one high-speed device is connected thereto and active; and
adjust wireless circuitry of the second wireless subsystem to use a symmetric MIMO mode when the first wireless subsystem and the second wireless subsystem do not share a common or overlapping frequency band.

18. The method of claim 17, wherein
the first wireless subsystem operates in accordance with a Bluetooth protocol; and
the second wireless subsystem operates in accordance with an 802.11 Wi-Fi protocol.

19. The method of claim 18, wherein
the connection state of the at least one high-speed wired connection port further indicates whether an external device connected via the at least one high-speed wired connection port is configured to operate in accordance with a universal serial bus (USB) 3.0 protocol.

* * * * *